United States Patent
Hirota et al.

(10) Patent No.: US 6,868,402 B1
(45) Date of Patent: Mar. 15, 2005

(54) DOCUMENT TRANSMIT SYSTEM AND DOCUMENT TRANSMITTING METHOD

(75) Inventors: Junko Hirota, Yokohama (JP); Satoshi Takeuchi, Yokohama (JP); Koichi Yamabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/203,609

(22) Filed: Dec. 2, 1998

(30) Foreign Application Priority Data

Dec. 5, 1997 (JP) ............................................. 9-352243

(51) Int. Cl.$^7$ ................................................. H04L 9/00
(52) U.S. Cl. .............................. 705/40; 380/4; 380/74; 380/49; 705/1; 705/43; 705/44; 707/505; 707/506
(58) Field of Search ............................... 705/40, 1, 43, 705/44; 707/505, 506

(56) References Cited

U.S. PATENT DOCUMENTS

| | | |
|---|---|---|
| 5,136,646 A | 8/1992 | Haber et al. |
| 5,513,117 A | 4/1996 | Small |
| 5,590,197 A | 12/1996 | Chen et al. |
| 5,615,268 A | 3/1997 | Bisbee et al. |

FOREIGN PATENT DOCUMENTS

| | | |
|---|---|---|
| WO | 9703410 | 1/1997 |
| WO | 9716897 | 5/1997 |

OTHER PUBLICATIONS

Gralla, Peter, How the Internet Works, pp. 298–303.*
"SET Secure Electronic Transaction Specification Book 1: Business Description", Version 1.0, Mar. 31, 1997.

* cited by examiner

Primary Examiner—Richard Weisberger
(74) Attorney, Agent, or Firm—Antonelli, Terry, Stout & Kraus, LLP

(57) ABSTRACT

In response to a fee payment request issued from an applicant apparatus via a communication network, a payment acceptance server makes a payment credit inquiry of an applicant to a financial institution server. When a payment acceptance server judges that a payment by the applicant is quaranteed, the payment acceptance server transmits to an applicant apparatus, an electronic payment certificate corresponding to a stamp, or an inspection sticker. A document with the payment certificate is transmitted from either the applicant apparatus or an agent apparatus to a document acceptance server via the communication network. Before a main body of the document is received, the document acceptance server receives from the document transmitting apparatus, compressed data which is acquired by applying one-way cryptographic function, and sets this reception timing as acceptance day/time this document.

9 Claims, 15 Drawing Sheets

OVERALL DIAGRAM OF DOCUMENT TRANSMIT SYSTEM

STRUCTURE OF CERTIFICATE AUTHORITY

STRUCTURE OF AGENT APPARATUS

STRUCTURE OF APPLICANT APPARATUS

FIG.6

CONTENT OF PAYMENT CERTIFICATE

| 601 | 602 | 603 | 604 | 605 |
|---|---|---|---|---|
| MANAGEMENT NUMBER | PAYMENT AMOUNT | APPLICANT INFORMATION | EXPIRATION DATE | SIGNATURE |

FIG.7

CONTENT OF PAYMENT MANAGEMENT DB

| 701 | 702 | 703 | 704 | 705 | 706 |
|---|---|---|---|---|---|
| MANAGEMENT NUMBER | PAYMENT AMOUNT | APPLICANT INFORMATION | EXPIRATION DATE | SIGNATURE INFORMATION | USE STATE |
| ⋮ | ⋮ | ⋮ | ⋮ | ⋮ | ⋮ |

FIG.8

CONTENT OF TICKET

| 801 | 802 | 803 | 804 | 805 |
|---|---|---|---|---|
| ACCEPTANCE NUMBER | TRANSMITTER INFORMATION | ACCEPTANCE DAY/TIME | EXPIRATION DATE | SIGNATURE |

FIG.9

CONTENT ACCEPTANCE MANAGEMENT DB

| 901 | 902 | 903 | 904 | 905 | 906 | 907 | 908 |
|---|---|---|---|---|---|---|---|
| ACCEPTANCE NUMBER | TRANSMITTER INFORMATION | ACCEPTANCE DAY/TIME | EXPIRATION DATE | MESSAGE DIGEST | TRANSMITTER CERTIFICATE | TICKET MANAGEMENT INFORMATION | CONTENTS OF DOCUMENT |
| ⋮ | ⋮ | ⋮ | ⋮ | ⋮ | ⋮ | ⋮ | ⋮ |

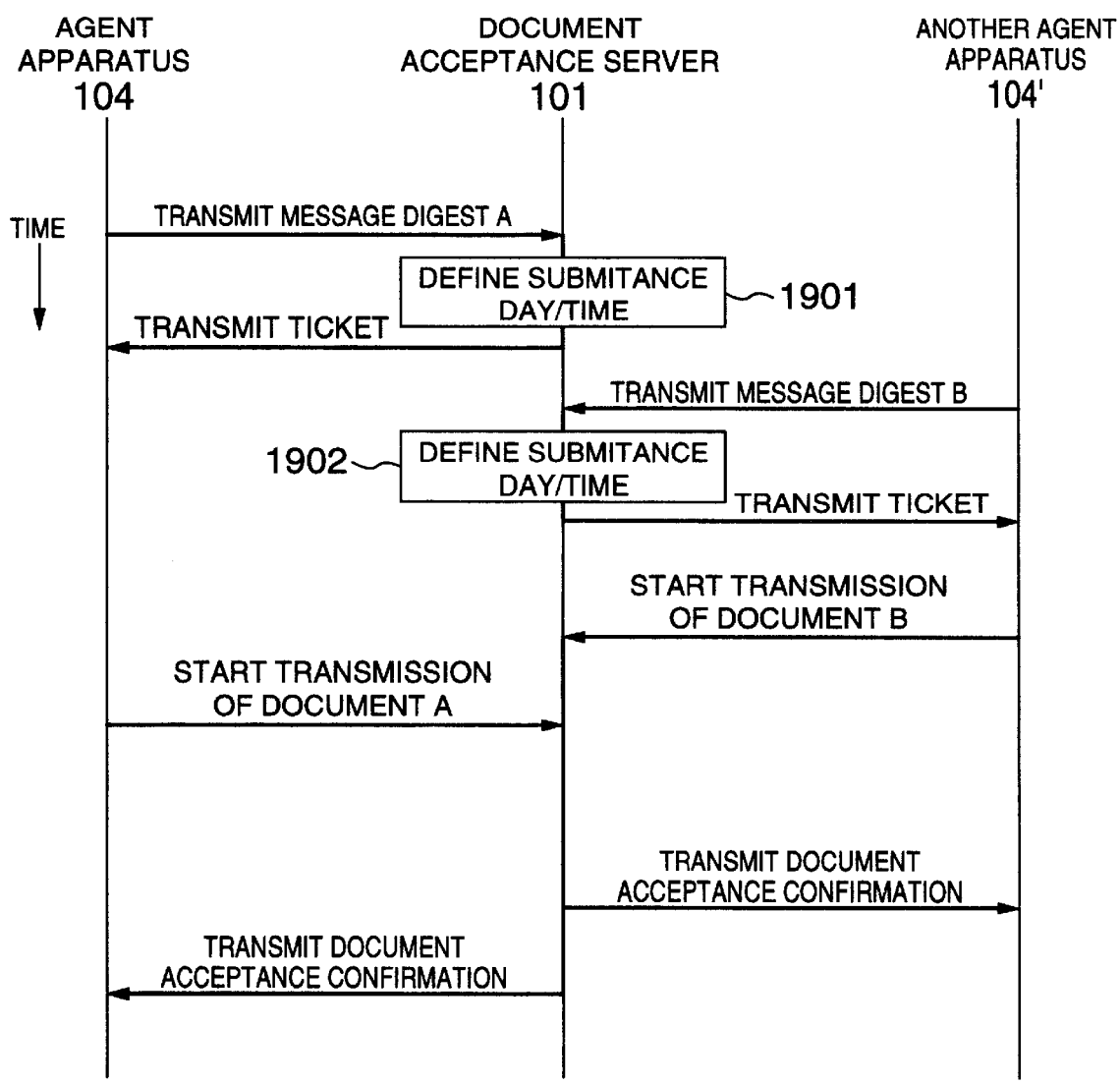

DOCUMENT TRANSMIT SYSTEM AND DOCUMENT TRANSMITTING METHOD

BACKGROUND OF THE INVENTION

The present invention is directed to a document transmitting method and also a document transmit system by which various sorts of documents are transmitted/accepted in the form of electronic data, and fee/charge are paid, and further fee/charge payments are accepted in the form of electronic data in connection with transmission/acceptance of these documents.

Recently, under open type network environments such as the Internet, various sorts of document data and also commercial transactions are performed. In future, various modes of these business activities will be progressed. For instance, nowadays, filing documents may be electronically submitted to Japanese Patent Office in such a manner that file submitting persons directly dial to the server installed in Japanese Patent Office so as to transmit document data of these files. However, in future, there are many possibilities that the file submitting persons are connected via the Internet to Japanese Patent Office. On the other hand, for example, as to registration of real estate, registration of commercial firms, or issuing activities of other certificates by governmental offices (certificate of residence), applicants directly must go to a registry office, or a public office so as to submit documents (various application documents) and complete necessary procedures. However, in future, such activities may be performed via the Internet.

In the case that the documents are electronically submitted via the Internet and the like by way of the communication, fees should be paid since these electronic documents are submitted. In most case, a stamp, or an inspection sticker is bought and attached onto a submission document, and then this document attached with the stamp, or inspection sticker is submitted to governmental offices such as Japanese Patent Office, registry offices, and public offices. When documents are submitted by way of communications, a certain fee payment system is necessarily required. For instance, in accordance with the electronic filing system introduced by Japanese Patent Office, document submitting persons remit a certain amount of money in advance to the prepayment bank account. In the system of Japanese Patent Office, when a patent filing is accepted, a necessary amount of money is drawn from this prepayment bank account.

On the other hand, in a commercial transaction called as an "electronic shopping", various sorts of products can be purchased via the Internet. Usually, this transaction payment is carried out by drawing the necessary amount of money from a bank account, or a credit card account. Specifically, a person who wants to buy a product transmits either a credit card number or a bank account number via communication. A product selling side draws a predetermined amount of money from the bank account or credit card account by using the transmitted number. Very recently, the Internet electronic payment system called as SET (Secure Electronic Transaction) has been proposed. SET processing is disclosed in for example "SET Secure Electronic Transaction Specification Book: Business Description", Version 1.0, May 31, 1997.

In such a case that the fee should be paid when the document is electronically submitted via the communication manner such as the Internet, if the amount drawing system from the prepayment account as in the electronic filing system of Japanese Patent Office is employed, then any persons who want to submit documents must open such prepayment accounts in advance, namely very inconvenient. When real estate is registered in a registry office, a person who submits this registration document will complete such a registration procedure only once in his/her life. Therefore, if this document submitting person should open such a prepayment account, then this may cause very cumbersome works.

As a payment method not by a prepayment account, there is a method for drawing a necessary amount of money from a bank account, or a credit card account. In this case, the process for drawing the necessary amount of money from the bank account, or the credit card account designated by the applicant, and the process for submitting/accepting the document in the communication manner should be carried out in separate phases. As a consequence, the following risk may happen to occur. That is, after a document has been submitted, for example, a total amount of money deposited on a bank account is smaller than a total fee to be drawn.

In accordance with the protocol of the above-described SET system, the electronic payment can be done on the Internet. This payment system can be established under such an initial condition that a person who purchases goods is completely identical to a person who pays fees thereof, and further the payment is done at the same time when the person requests to purchase the goods. As a consequence, this SET protocol system cannot be properly applied to such a procedure that either a stamp or an inspection sticker is attached to a document, and then this document with the stamp, or the inspection sticker is submitted to a governmental office such as a patent office, a registry office, and a public office. This is because in such a document submission system, an agent, or an attorney for an applicant who wishes to submit a document may submit this document on behalf of this applicant. That is to say, the applicant of the document should pay money to purchase the stamp, or the inspection sticker to be attached to the document, whereas this document is submitted by the agent. In other words, the person who pays the fee is different from the person who submits the document. In this case, it is not possible to execute the payment procedure in accordance with the above-explained SET protocol while establishing the relationship with the document submission procedure. On the other hand, if the process for submitting the document and for paying the fee is carried out irrespective of the process for submitting this document, then the SET protocol may be used in the fee payment. However, in this case, when the fee payment procedure is made in connection with the document submission procedure, very cumbersome works are required.

On the other hand, when various sorts of documents are submitted, day/time of the document submissions are required to be defined. In the case that a document is submitted via a communication channel, when the condition of this communication channel is deteriorated, this document is required to be resent. Therefore, there is inconveniency that day/time of this document submission are not clear. In particular, if day/time when a transmission of a document is commenced is set as day/time when this document is submitted, then the following illegal utilization could be made. That is, after the document transmission has been commenced to secure the day/time of this document submission, another document having a different content from that of the first-submitted document is transmitted later because the resend subject occurs. Then, this submission person may assert that the resent document was really submitted on the above-described day/time. As a consequence, it is required to establish such a submission day/time defining system capable of rationally determining day/time when a document is submitted via a communication channel.

SUMMARY OF THE INVENTION

An object of the present invention is to provide a document transmit system and also a document transmit method, capable of transmitting a document made in an electronic form via a communication network and further capable of paying a fee/charge thereof in a proper manner.

In accordance with the document transmit method/system capable of achieving the above-explained object, in such a case that a fee should be paid when a document is submitted in an electronic manner via a communication channel such as the Internet, no specific account such as a prepayment bank account is longer required, but also a process for drawing a necessary fee amount from a bank amount and a credit card amount is not required to be carried out in a separate phase. Moreover, even in such a case that a person who pays a fee is different from a person who submits a document, the document can be properly submitted and also the fee can be properly paid.

Another object of the present invention is to provide a document transmit system and a document transmit method, equipped with a rule capable of rationally determining day/time of an document submission formed in an electronic manner while this electronic document is submitted in a communication channel.

To achieve the above-described objects, a document transmit system, according to an aspect of the present invention, is featured by that in a document transmit system for transmitting a document from an applicant apparatus via a network to a document acceptance server, a payment acceptance server is connected to the network; the applicant apparatus includes a means for requesting the payment acceptance server to accept payment of a fee by designating a payment amount; the payment acceptance server includes a means for making a payment credit inquiry to a financial institution in response to a fee payment request issued from the applicant apparatus; and a means for forming, in a not-alterable form, a payment certificate used to indicate that the fee payment is guaranteed when it can be judged that the fee payment of the applicant can be guaranteed in the credit inquiry, and then for transmitting the formed payment certificate to the applicant apparatus; the applicant apparatus includes a means for attaching the payment certificate to the document to be transmitted to thereby constitute a document with a payment certificate in a not-alterable form, and then for transmitting the document with the payment certificate to the document acceptance server; and the document acceptance server includes a means for confirming that a payment certificate sent from the applicant apparatus is an "unused" payment certificate, and thereafter for saving the document with the payment certificate into a storage apparatus.

Also, a document transmit system, according to another aspect of the present invention, is featured by that in a document transmit system for transmitting a document which is wanted to be transmitted by an applicant apparatus via a network to a document acceptance server from an agent apparatus as a proxy, a payment acceptance server is connected to the network; the applicant apparatus includes a means for requesting the payment acceptance server to accept payment of a fee by designating a payment amount; the payment acceptance server includes a means for making a payment credit inquiry to a financial institution in response to a fee payment request issued from the applicant apparatus; and a means for forming, in a not-alterable form, a payment certificate used to indicate that the fee payment is guaranteed when it can be judged that the fee payment of the applicant can be guaranteed in the credit inquiry, and then for transmitting the formed payment certificate to the applicant apparatus; the applicant apparatus includes a means for attaching the payment certificate to the document to be transmitted to thereby constitute a document with a payment certificate in a not-alterable form, and then for transmitting the document with the payment certificate to the agent apparatus; the agent apparatus includes a means for transmitting the received document with the payment certificate to the document acceptance server; and the document acceptance server includes a means for confirming that a payment certificate sent from the agent apparatus is an "unused" payment certificate, and thereafter for saving the document with the payment certificate into a storage apparatus.

Also, a document transmit system, according to another aspect of the present invention, is featured by that in a document transmit system for transmitting a document from an applicant apparatus via a network to a document acceptance server, a payment acceptance server for accepting a fee payment in connection with the document transmission is comprised of: a means for making a payment credit inquiry to a financial institution in response to a fee payment request issued from the applicant apparatus; and a means for forming, in a not-alterable form, a payment certificate used to indicate that the fee payment is guaranteed when it can be judged that the fee payment of the applicant can be guaranteed in the credit inquiry, and then for transmitting the formed payment certificate to the applicant apparatus.

Further, a document transmit system, according to another aspect of the present invention, is featured by that in a document transmit system where a document is transmitted from a predetermined apparatus via a network to a document acceptance server, the document transmit system is comprised of: a means for applying an one-way cryptographic function to document data to be transmitted so as to acquire compressed data in the document transmitting apparatus, and then for transmitting the compressed data in a not-alterable form to the document acceptance server; a means for transmitting a ticket to the document transmitting apparatus after the received compressed data has been stored into a storage apparatus by the document acceptance server; a means for transmitting the document data to be transmitted to the document acceptance server after the ticket is received by the document transmit apparatus; and a means for comparing the compressed data which is obtained by applying the one-way cryptographic function to the document data with the compressed data which is stored into the storage apparatus after the document data is received by the document acceptance server, and for confirming that the first-mentioned compressed data is made identical with the second-mentioned compressed data.

Also, a document transmit method, according to a further aspect of the present invention, is featured by such a document transmit method for transmitting a document from an applicant apparatus via a network to a document acceptance server, comprising: a step for requesting from the applicant apparatus a payment acceptance server connected to the network to accept a fee payment by designating a payment amount; a payment for making a payment credit inquiry to a financial institution in response to a fee payment request issued from the applicant apparatus by said payment acceptance server; a step for forming, in a not-alterable form, a payment certificate used to indicate that the fee payment is guaranteed when it can be judged that the fee payment of the applicant can be guaranteed in the credit inquiry, and then for transmitting the formed payment certificate to the applicant apparatus; a step for attaching the payment certificate to the document to be transmitted to thereby constitute a document with a payment certificate in a not-alterable form, and then for transmitting the document with the payment certificate to the document acceptance server; and a step for confirming that a payment certificate sent from the applicant apparatus is an "unused" payment certificate, and thereafter for saving the document with the payment certificate into a storage apparatus.

Furthermore, a document transmitting method, according to a still further aspect of the present invention, is featured by such a document transmit method for transmitting a document from a predetermined apparatus via a network to a document acceptance server, comprising: a step for applying an one-way cryptographic function to document data to be transmitted so as to acquire compressed data in the document transmitting apparatus, and then for transmitting the compressed data to the document acceptance server in a not-alterable form; a step for transmitting a ticket to the document transmitting apparatus after the received compressed data has been stored into a storage apparatus by the document acceptance server; a step for transmitting the document data to be transmitted to the document acceptance server after the ticket is received by the document transmit apparatus; and a step for comparing the compressed data which is obtained by applying the one-way cryptographic function to the document data with the compressed data which is stored into the storage apparatus after the document data is received by the document acceptance server, and for confirming that the first-mentioned compressed data is made identical with the second-mentioned compressed data.

In accordance with the embodiment of the present invention, in such a case that the fee payment is required when the electronically formed document is submitted via the communication channel such as the Internet, if the payment request is issued to the payment acceptance server, then this payment acceptance server makes the credit inquiry. In the case that the fee payment is guaranteed, since the payment acceptance server issues the not-alterable form payment certificate, the fee payer need not open such a specific account as the prepayment bank account. There is no risk that when the process for drawing the fee amount from the bank account, or the credit card account is carried out in the separate phase, the necessary fee amount cannot be drawn. Also, even when the person who pays the fee is different from the person who submits the document, the document can be properly submitted and also the fee of this document submission can be carried out in the proper manner.

Also, according to the embodiment, before the document is transmitted, the compressed data is sent which has been compressed by applying the one-way cryptographic function to this document. Thereafter, the actually sent document is compared with the compressed data which has been formed by using the same one-way cryptographic function. As a result, when the document is submitted via the communication channel in the electronic manner, the rule can be provided by which the submission day/time can be rationally determined without allowing the illegal submission.

BRIEF DESCRIPTION OF THE DRAWINGS

For a better understanding of the present invention, reference is made of a detailed description in conjunction with the accompanying drawings, in which:

FIG. 6 illustrates a content of a payment certificate employed in the document transmit system according to the embodiment shown in FIG. 1;

FIG. 7 illustrates a content of a payment certificate management DB used in the system according to the embodiment shown in FIG. 1;

FIG. 8 illustrates a content of a ticket transmitted from the document acceptance server to the applicant apparatus employed in the system according to the embodiment shown in FIG. 1;

FIG. 9 illustrates a content of an acceptance management DB used in the system according to the embodiment shown in FIG. 1;

FIG. 19 schematically represents a timing chart for determining a document acceptance day/time by a document server in the system according to the embodiment shown in FIG. 1.

DESCRIPTION OF THE PREFERRED EMBODIMENTS

Referring now to drawings, an embodiment of the present invention will be described.

Figure 1:
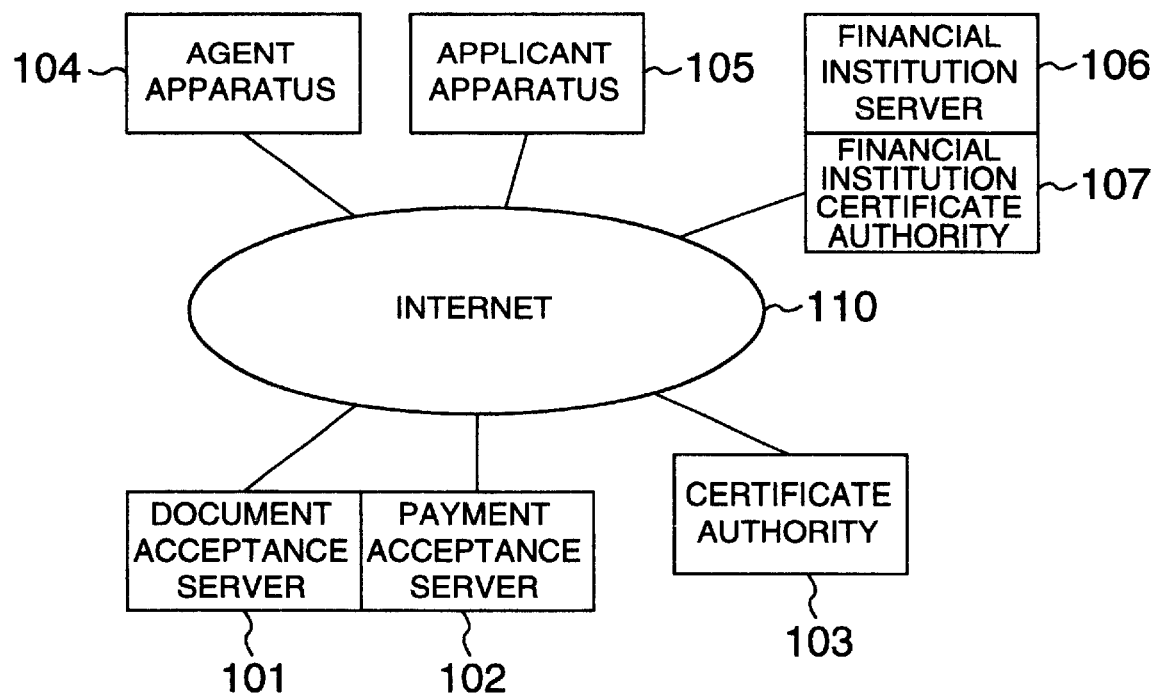
FIG. 1 schematically indicates an overall arrangement of a document transmit system according to an embodiment of the present invention.

FIG. 1 schematically an overall arrangement of a document transmit system according to one embodiment of the present invention. As shown in this drawing, a document acceptance server 101, a payment acceptance server 102, a certificate authority 103, an agent apparatus 104, an applicant apparatus 105, a financial institution server 106, and a financial institution certificate authority 107 are connected to the Internet 110. It should be noted that the above-explained apparatuses 101 to 107 correspond to computer nodes, respectively.

A process flow operation executed in the document transmit system of FIG. 1 will now be summarized. For the sake of a simple description, a data process flow operation except for an encryption/decryption process and a digital signature process (will be explained later with reference to flow charts) will now be explained.

The applicant apparatus 105 corresponds to such an apparatus operable by an applicant who wants to submit a document with payment of a predetermined fee. The agent apparatus 104 corresponds to such an apparatus operable by an agent who submits a document on behalf of the relevant applicant (namely, actually transmit document). A document to be submitted is firstly formed by an agent by using the agent apparatus 104 in response to a request issued from an applicant. The formed document data is transmitted to the applicant apparatus 105. The applicant confirms a content of the received document data, and then saves this document data. Also, the applicant performs a fee payment process via the applicant apparatus 105 to be connected to the payment acceptance server 102.

The payment acceptance server 102 corresponds to such a server used to perform a process operation related to a fee payment in connection with a document submission. Upon receipt of a fee payment process request issued from the applicant apparatus 105, after this payment acceptance server 102 is connected to the financial institution server 106 to execute a credit inquiry of the relevant applicant, this payment acceptance server 102 returns a payment certificate to the applicant apparatus 105. A payment certificate corresponds to such data capable of certificating that an applicant pays a fee (otherwise, guaranteed payment reservation), and also is equal to data corresponding to a stamp, and an inspection sticker (will be discussed later). In this embodiment, a payment certificate is managed in a payment certificate management database (DB) which can be commonly accessed by both the document acceptance server 101 and the payment acceptance server 102. The applicant receives this payment certificate by the applicant apparatus 105, and attaches the received payment certificate to the saved document data, and then transmits this document data to the agent apparatus 104. The agent receives this document data by the agent apparatus 104 to once save the received document data. Thereafter, the agent transmits this document data to the document acceptance server 101 at arbitrary timing.

The document acceptance sever 101 is such a server for accepting an electronically submitted document transmitted from the agent apparatus 104. The agent apparatus 104 receives data (namely, data made by attaching payment certificate to document data) sent from the agent, and then inspects the payment certificate to thereby save the document data. Inspection of payment certificate is such a process operation that an interrogation is sent to the payment certificate management DB as to whether or not this payment certificate is unused, and if this payment certificate is not yet used, then the document acceptance server 101 sets this payment certificate to be used.

The certificate authority 103 corresponds to a certificate authority for issuing a certificate used to certify an applicant, or an agent. The financial institution server 106 corresponds to a server of a financial institution where an account of an applicant is set. The financial institution certificate authority 107 corresponds to a certificate authority for issuing a certificate used to certify such an applicant having this account.

Figure 2:
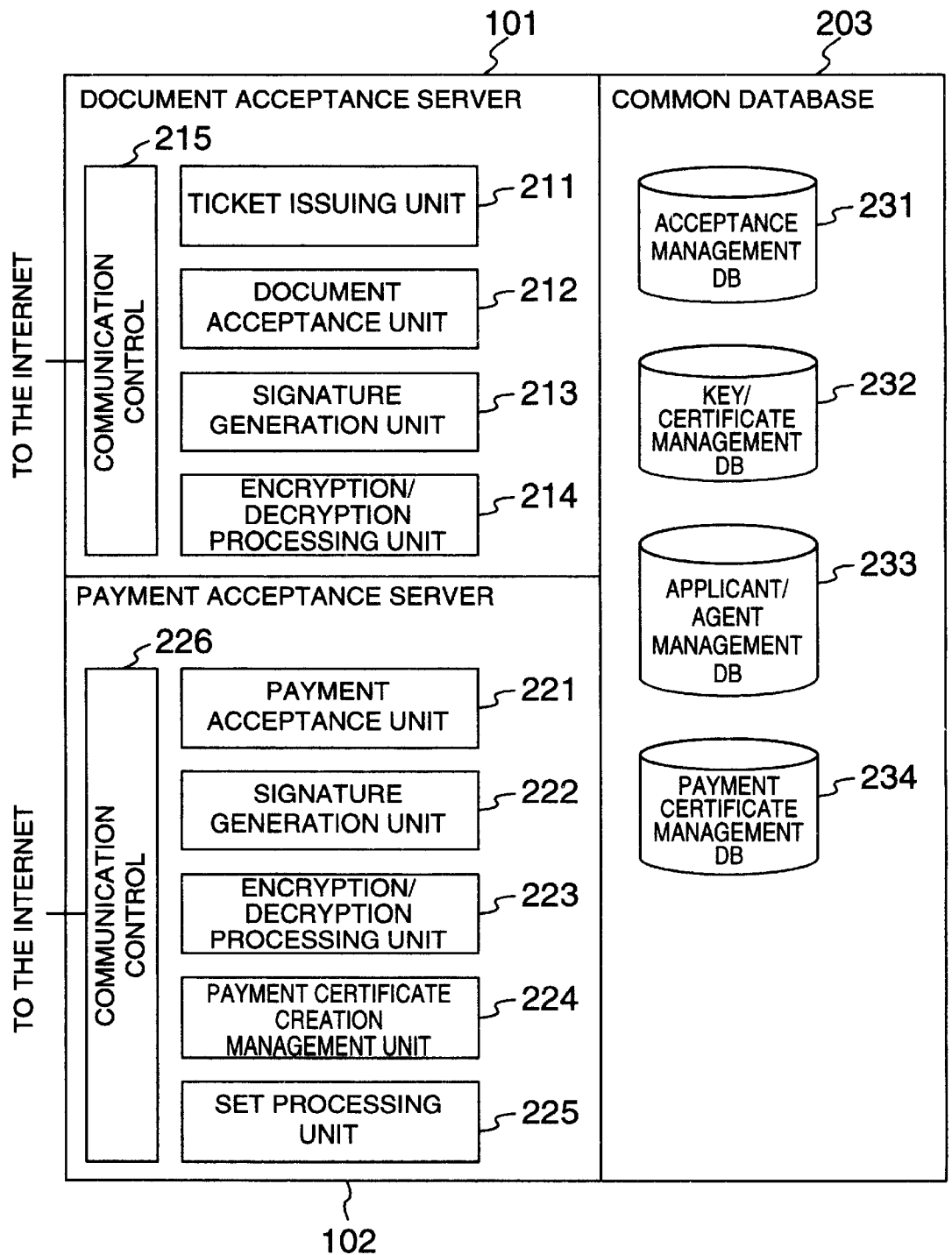
FIG. 2 schematically represents an internal arrangement of a document acceptance server and an internal arrangement of a payment acceptance server, employed in the document transmit system shown in FIG. 1.

FIG. 2 schematically shows an internal arrangement of the above-described document acceptance server 101 and an internal arrangement of the above-explained payment acceptance server 102 shown in FIG. 1.

The document acceptance server 101 is equipped with a ticket issuing unit 211, a document acceptance unit 212, a signature generation unit 213, an encryption/decryption unit 214, and a communication control unit 215. The payment server 102 is equipped with a payment acceptance unit 221, another signature generation unit 222, another encryption/decryption unit 223, a payment certificate producing/managing unit 224, a SET processing unit 225, and another communication control unit 226. Also, an acceptance management DB 231, a key/certificate management DB 232, and applicant/agent management DB 233, and a payment certificate management DB 234 are provided as a common database (DB) which can be commonly accessed from the document acceptance server 101 and the payment server 102.

The document acceptance server 101 accepts a document which is transmitted from the agent apparatus 104 via the Internet 110 (see FIG. 1). The document acceptance unit 212 performs a process operation to accept this document (will be explained in detail with reference to FIG. 18). The ticket issuing unit 211 performs a ticket issuing process operation (will be explained in detail with reference to FIG. 17) before actual document data is received while executing the document acceptance process. The ticket issuing operation corresponds to a process operation such that the document acceptance server 101 determines document submission date/time. In other words, when a document is transmitted from the agent apparatus 104 to the document acceptance server 101, if a document to be actually sent is directly transmitted as data, then very lengthy time is required. Therefore, this document may have to resend for many times. This resend necessity may make the submission timing of this document unclear, or vague. There is such a risk that the unclear document submission timing is utilized in an illegal manner. As a consequence, this document transmit system performs the below-mentioned process operations (1) to (4).

(1). First, the data to be actually transmitted is compressed by using an one-way cryptographic function (for example, hash function) by the agent apparatus 104 to acquire a message digest. Then, this message digest is sent to the document acceptance server 101 (precisely speaking, encrypt communication with certificate is carried out).

(2). In the document acceptance server 101, a new accept number is acquired by executing a ticket issuing process operation (see FIG. 17) in the ticket issuing unit 211. Thereafter, the document acceptance server 101 stores this new acceptance number in correspondence with the message digest, and also sends this acceptance number to the agent apparatus 104. The data used to transmit this acceptance number is a ticket. It should be understood that at this time, the document acceptance server 101 determines acceptance day/time of a document corresponding to this message digest (will be described later).

(3). After the agent apparatus 104 accepts the acceptance number by the ticket, this agent apparatus 104 attaches this acceptance number to the data which is actually sent, and then transmits this data attached with the acceptance number to the document acceptance server 101.

(4). After all of the data sent from the agent apparatus 104 have been received by the document acceptance server 101, this document acceptance server 101 compresses this data by the one-way cryptographic function (same function as being used in above item (1)) to acquire a message digest, and confirms as to whether or not this acquired message digest is made identical with the message digest stored in the above item (2). When the acquired message digest is made identical with the stored message digest, such data which is intended to be actually sent from the agent apparatus 104 when the ticket is issued is received. On the other hand, when the acquired message digest is not made identical with the stored message digest, another data is transmitted.

FIG. 8 schematically represents a content of a ticket transmitted from the document acceptance server 101 to the agent apparatus 104 in the document transmit system according to this embodiment. An acceptance number 801 corresponds to such a number allocated by the document acceptance server 101 when a document is sent from the agent apparatus 104 in correspondence with this document transmission. Transmitter information 802 corresponds to various information capable of identifying a transmitter (agent) which transmits a document thereof. An acceptance day/time 803 corresponds to a day/time when the document acceptance server 101 completes an acceptance of a message digest. An expiration date 804 indicates an expiration date of this ticket. It should be noted that even when resending of a document occurs while the document is transmitted from the agent apparatus 104, a sufficient expiration date capable of sending this document may be set (namely, preselected time after ticket is issued may be set). This expiration date 804 is determined in order to avoid such a fact that a document is resent with an extremely long delay. A signature 805 corresponds to an electronic signature of the document acceptance server 101 given to the data denoted by reference numerals 801 to 804.

FIG. 9 represents a content of the acceptance management DB 231 shown in FIG. 1 used in the document transmit system of this embodiment. In the case that the new acceptance number is acquired in the ticket issuing process (FIG. 17) of the above item (2), the document acceptance server 101 acquires the new acceptance number from this acceptance management DB 231, and secures a 1-line region corresponding to this acceptance number. The same contents as those of the information 801 to 804 set to the transmitted ticket (FIG. 8) are stored into the acceptance number 901, the transmitter information 902, the acceptance day/time 903, and the expiration date 904. The information sent from the agent apparatus 104 in the above item (1) is stored into the message digest 905 and the transmitter certificate 906. Also the ticket management information 907 is used to store flag information used to indicate as to whether or not this ticket is used. An initial value of this ticket management information 907 is set to "unused". Contents of document 908 correspond to a region used to store data of an entire document sent from the agent apparatus 104. When a confirmation is once made of the identification of the message digests in the above item (4), the document acceptance server 101 sets the ticket management information 907 to "used", and then stores the received document data into the contents of document 908.

Referring back to FIG. 2, the arrangement of the document acceptance server 101 is explained. The signature generation unit 213 and the encryption/decryption processing unit 214 are used when a signature is attached to data to be transmitted/received, and the encryption/decryption process is carried out while the document acceptance process is carried out. The communication control unit 215 performs a communication control between this document acceptance server 101 and the Internet 110.

The payment acceptance server 102 accepts a fee payment from an applicant. In the system of this embodiment, the applicant can be connected from the applicant apparatus 105 to the payment acceptance server 102 so as to perform a fee payment process. In FIG. 2, the payment acceptance unit 221 executes a process for accepting a fee payment request issued from this applicant (will be discussed in detail in FIG. 13), and then issues to the applicant, a payment certificate for indicating that the applicant actually pays the fee (otherwise, securing that fee is paid). A payment certificate may play a role such as a stamp, an inspection sticker, a note, and a gift certificate. The payment certificate is issued as follows. After a payment credit inquiry and a payment reservation are made to a financial institution as to the relevant applicant, this payment certificate is issued. As a consequence, the operation institutions of the document acceptance server 101 and the payment acceptance server 102 can surely draw an amount issued by the payment certificate from the account of this applicant. It should be noted that a payment certificate is different from a prepayment, and therefore a prepayment account is not previously opened. A payment certificate may be used in another case, or may be given to a third party, which is similar to a stamp.

FIG. 6 indicates a content of a payment certificate used in the document transmit system according to this embodiment. The payment certificate is constructed of a management number 601, a payment amount 602, applicant information 603, an expiration date 604, and also a signature 605 of the payment acceptance server 102. The management number 601 corresponds to such a management number specific to the payment certificate. The payment amount 602 corresponds to information about an amount designated by an applicant to pay. The applicant information 603 corresponds to information used to specify such an applicant who issues a payment request and then receives a payment certificate thereof. The expiration date 604 corresponds to such an expiration date for this payment certificate. The signature 605 corresponds to a signature of the payment acceptance server 102 which issues this payment certificate. This signature may guarantee that this payment certificate is surely issued from the payment acceptance server 102. The above-explained information 601 to 605 is set in such a case that the payment acceptance server 102 issues the relevant payment certificate to such an applicant equal to a fee payer.

FIG. 7 shows a content of the payment certificate management DB 234 shown in FIG. 1 and used in the system according to this embodiment. The payment acceptance server 102 manages the issued payment certificate in this payment certificate management DB 234. The information about the contents 601 to 605 of the issued payment certification is stored into contents 701 to 705 of the payment certificate management DB 234. A use state 706 is a flag used to indicate as to whether or not the relevant payment certificate is used. When the document acceptance server 101 accepts a document, this document acceptance server 101 searches the payment management DB 234 based upon the management number 601 of the payment certificate attached to this document so as to seek an entry corresponding to this management number. When the use state 706 of this entry is equal to "unused", since this payment certificate is not yet used, this use state 706 is set to "used". This may correspond to such a confirmation that either a stamp or an inspection sticker is attached. In the case that another document with using the same payment certificate is again sent, since the use state 706 is equal to "used", it can be confirmed that a fee payment cannot be guaranteed.

Since the payment certificate is managed by the payment certificate management DB 234 shown in FIG. 7, even when the applicant who pays the fee is not equal to the agent who actually transmits the document, the procedure can be done. Also, the payment certificate is sold to a third party, and then the third party can use this payment certificate.

Again, referring back to FIG. 2, the description of the arrangement of the payment acceptance server 102 is continued. While the payment acceptance process is carried out, a signature generation unit 222 and an encryption/decryption processing unit 223 are used to attach a signature to data to be transmitted/received, and employed to execute the encryption/decryption processing operation. A payment certificate creation management unit 224 produces the payment certificate shown in FIG. 6, and manages this payment certificate by the payment certificate management DB 234 indicated in FIG. 7. A SET processing unit 225 executes a process operation in accordance with the SET protocol when the payment acceptance server 102 issues a credit inquiry of an applicant to the financial institution server 106. A communication control unit 226 performs a communication control for the Internet 110.

The description has been made with reference to FIG. 7 and FIG. 9 as to such a fact that both the document acceptance server 101 and the payment server 102 can access, and also as to the acceptance management DB 231 and the payment certificate management DB 234, which may be called the common DBs. A key/certificate management DB 232 corresponds to such a DB (database) capable of managing secret keys/public keys of the document acceptance server 101 and the payment server 102; certificates issued from the certificate authorities 103, 107; public keys of the certificate authorities 103, 107 used when the certification is carried out; and also a public key of a communication counter party. An applicant agent management DB 233 corresponds to such a DB for managing information related to the applicant and the agent, which are connected to the document acceptance server 101 and the payment server 102.

It should be understood that in this embodiment, while the document acceptance server 101 and the payment server 102 are separately provided as two different apparatuses, the common DB 203 can be commonly used by these servers 101 and 102. Alternatively, this common DB may be completely subdivided into two sets of DBs. In this alternative case, the acceptance management DB 231 may be managed by the document acceptance server 101, and the payment certificate management DB 234 may be managed by the payment accept server 102. In this case, the document acceptance server 101 may request the payment acceptance server 102 so as to change the use state of this entry from "unused" into "used" instead of the below-mentioned operation. That is, this document acceptance server 101 accesses to the payment certificate management DB 234, and changes the use state 706 of the searched entry from "unused" to "used". Conversely, both the document acceptance server 101 and the payment acceptance server 102 may be arranged on a single apparatus in combination with the DB 203. In this alternative case, the communication control units 215 and 226, the signature generation units 213 and 222, and also the encryption/decryption processing units 214 and 223 may be constituted by a common arrangement.

Figure 3:
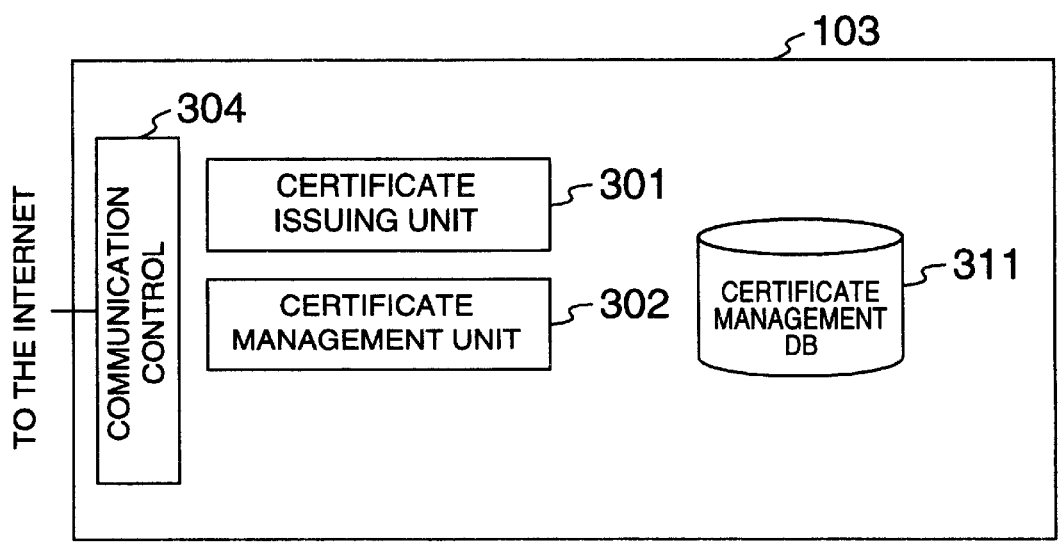
FIG. 3 schematically shows a structural arrangement of a certificate authority indicated in FIG. 1.

FIG. 3 represents an internal arrangement of the certificate authority 103 shown in FIG. 1. The certificate authority 103 is equipped with a certificate issuing unit 301, a certificate management unit 302, a communication control unit 304, and a certificate management DB 311. The certificate authority 103 previously issues a certificate to an agent and an applicant.

Figure 4:
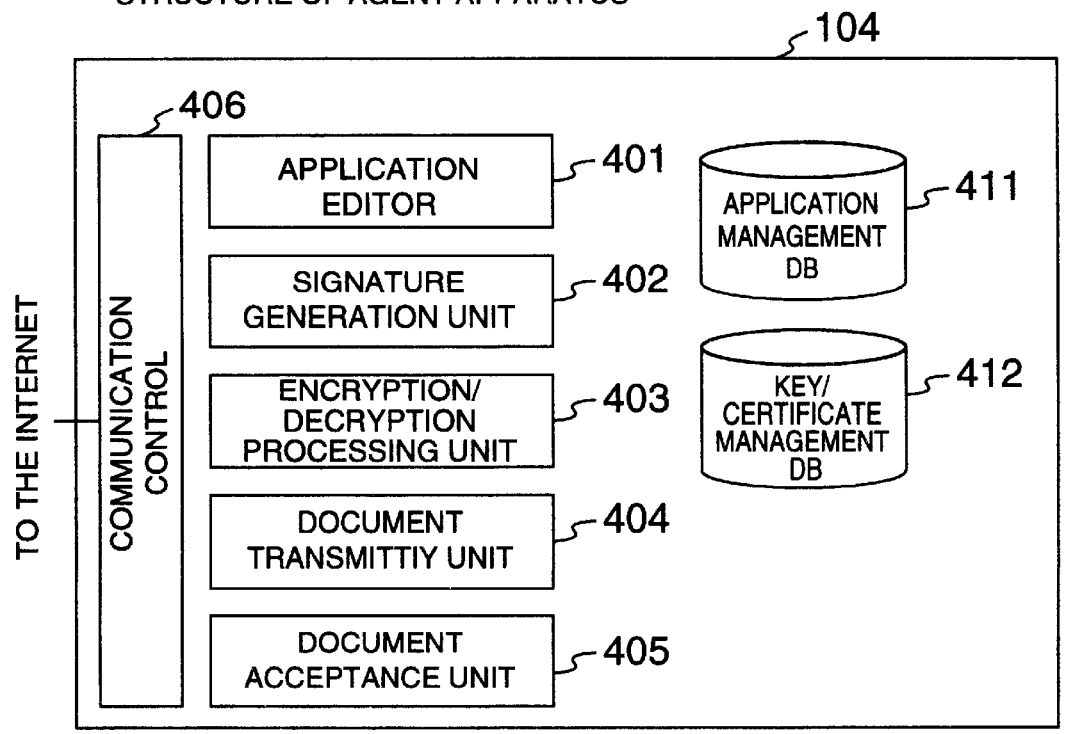
FIG. 4 schematically shows a structural arrangement of an agent apparatus indicated in FIG. 1.

FIG. 4 indicates an internal arrangement of the agent apparatus 104 shown in FIG. 1. The agent apparatus 104 is equipped with an application editor 401, a signature generation unit 402, an encryption/decryption processing unit 403, a document issuing unit 404, a document acceptance unit 405, a communication control unit 406, an application management DB 411, and a key/certificate management DB 412.

The application editor 401 is such an editor used by an agent to form a document to be sent. The document issuing unit 404 executes a process operation for sending a document to the applicant apparatus 105 (will be explained in detail in FIG. 10), and another process operation for sending a document with a payment certificate to the document acceptance server 101 (will be explained in detail in FIG. 16). The document acceptance unit 405 executes a process operation for accepting the document with the certificate sent from the applicant (will be discussed in detail in FIG. 15). Both the signature generation unit 402 and the encryption/decryption processing unit 403 are used when the signature is attached to the data to be sent/received, and the encryption/decryption processing operation is performed. The communication control unit 406 performs a communication control with the Internet 110.

The application management DB 411 is such a DB for saving the document formed by the agent by the applicant editor 401, and the document with the payment certificate sent from the applicant apparatus 105 to manage these documents. The key/certificate management DB 412 is such a DB for managing the secret key/public key of this agent apparatus 104; the certificates issued from the certificate authorities 103 and 107; the public keys of the certificate authorities 103 and 107 used when authentication is performed; and further the public key of the communication party.

Figure 5:
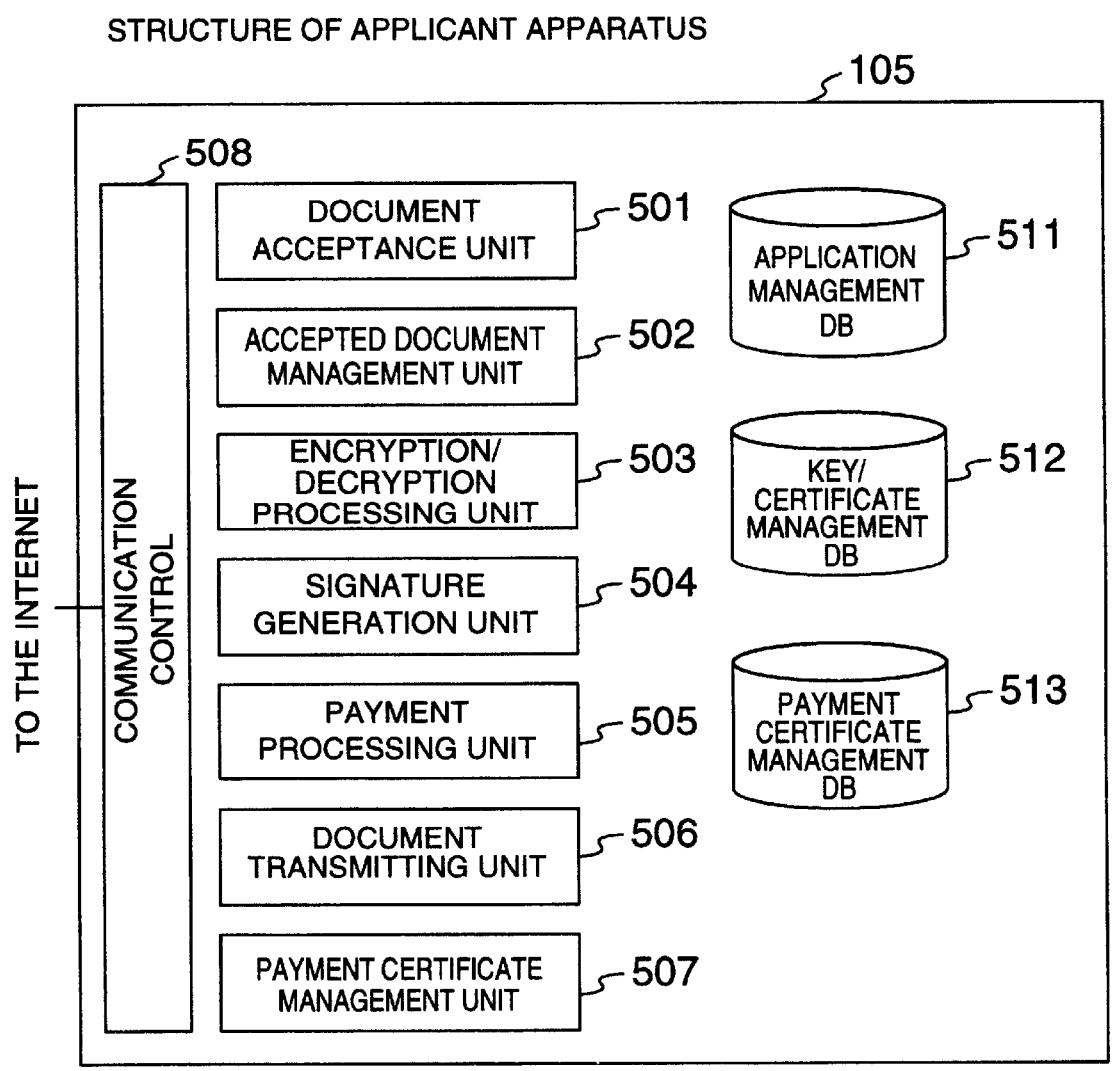
FIG. 5 schematically indicates a structural arrangement of an applicant apparatus shown in FIG. 1.

FIG. 5 shows an internal arrangement of the applicant apparatus 105 shown in FIG. 1. The applicant apparatus 105 is equipped with a document acceptance unit 501, an accepted document management unit 502, an encryption/decryption processing unit 503, a signature generation unit 504, a payment processing unit 505, a document transmitting unit 506, a payment certificate management unit 507, a communication control unit 508, an application management DB 511, a key/certificate management DB 512, and further a payment certificate management DB 513.

The document acceptance unit 501 performs a process operation for accepting a document sent from an agent (will be explained in detail in FIG. 11). The accepted document management unit 502 saves the accepted document in the application management DB 231 so as to manage the accepted document. The payment processing unit 505 performs a process operation to pay a fee by being connected to the payment reception server 102 (will be described in detail in FIG. 12). The document transmitting unit 506 executes a process operation for transmitting the document with the payment certificate to the agent (will be discussed in detail in FIG. 14). Both the signature generation unit 504 and the encryption/decryption processing unit 503 are used when the signature is attached to the data to sent/received, and the encryption/decryption processing operation is performed. The payment certificate management unit 507 performs a process operation for managing the payment certificate issued from the payment acceptance server 102 by the payment certificate management DB 513. The communication control unit 508 performs a communication control with the Internet 110.

The application management DB 511 is such a DB for saving the documents sent from the agent to manage these documents. The key/certificate management DB 512 is such a DB for managing the secret key/public key of this applicant apparatus 105; the certificates issued from the certificate authorities 103 and 107; the public keys of the certificate authorities 103 and 107 used when authentication is carried out; and also the public key of the communication party. The payment certificate management DB 513 is such a DB for saving the payment certificate issued from the payment acceptance server 102 so as to manage the payment certificate. The structure of this payment certificates management DB 513 is the same as the payment certificate management DB 234 of the payment acceptance server 102 as explained in FIG. 7. It should be noted that the payment certificate management DB 513 manages the payment certificate accepted by this applicant, and the use state 706 is information for indicating as to whether or not this applicant uses this payment certificate.

Referring now to flow charts of FIGS. 10–18 and a timing chart of FIG. 19, the various process operations executed in the document transmit system indicated in FIG. 1 will be described more in detail.

Figure 10:
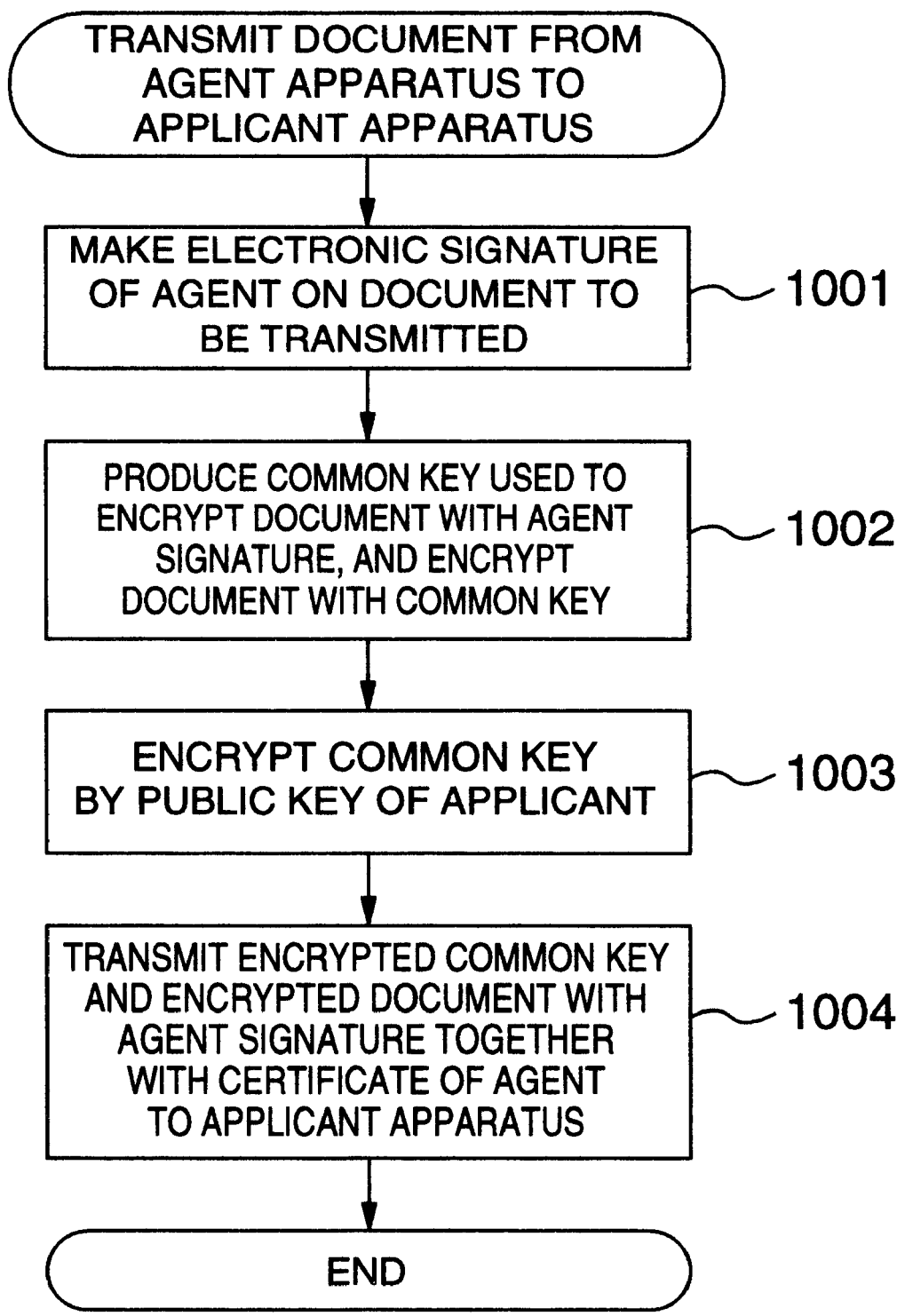
FIG. 10 is a flow chart for describing a process flow of a document transmitted from the agent apparatus to the applicant apparatus in the system according to the embodiment shown in FIG. 1.

FIG. 10 is a flow chart for describing a process flow operation of a document transmitted from the agent apparatus 104 to the applicant apparatus 105. This process operation mainly corresponds to the document transmitting process operation executed by the document transmitting unit 404 shown in FIG. 4. First, an agent forms a document by employing the application editor 401 indicated in FIG. 4 in response to a request issued by an applicant. At a step 1001, the agent makes an electronic signature on this formed document which will be transmitted. Concretely speaking, the document data is compressed by using the one-way cryptographic function (hash function etc.). Thereafter, this compressed data (namely, message digest) is encrypted by the secret key of the agent to obtain signature data. This signature data is attached to the original document data so as to produce a document attached with the electronic signature by the agent. At a next step 1002, a common key is produced by which the document having the agent signature may be encrypted, and then the document having the agent signature is encrypted by using this common key. The reason why the common key is used is to increase the decoding speed. Next, at a step 1003, the common key is encrypted by using the public key of the applicant. At a step 1004, both the encrypted document having the agent signature and the encrypted common key are transmitted together with a certificate of the agent to the applicant apparatus 105. Then, this document transmitting process operation is accomplished.

It should be understood that the certificate of the agent is in advance acquired from the certificate authority 103. A certificate of an agent corresponds to such data produced by that the public key of the agent is concatenated with various information related to this agent, and a signature is attached to this concatenated data by using the secret key of the certificate authority 103. Upon receipt of a certificate issuing request from the agent, the certificate authority 103 identifies this agent to thereafter issue the certificate. If this certificate is attached to data transmitted from the agent apparatus 104, then such a fact that this attached data is surely sent from this agent can be inspected. Also, various sorts of information for identifying the public key of the agent and the agent can be acquired from this certificate. Similarly, the applicant previously acquires a certificate from the certificate authority 103.

Figure 11:
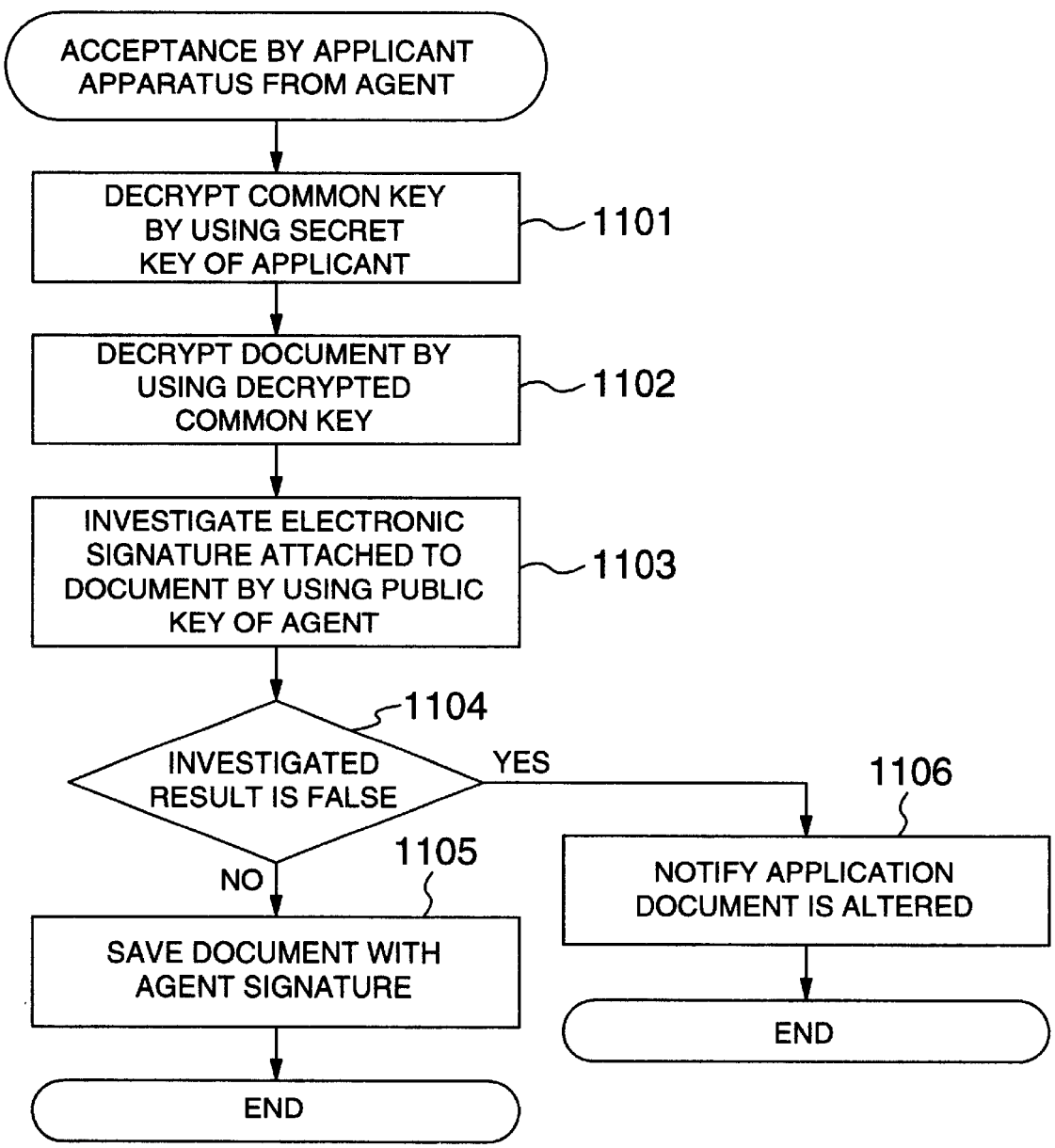
FIG. 11 is a flow chart for describing a process flow of the applicant apparatus for accepting data sent from the agent apparatus to the application apparatus in the system shown in FIG. 1.

FIG. 11 is a flow chart for describing a process operation of the applicant apparatus 105 for accepting the data which is transmitted from the agent apparatus 104 to the applicant apparatus 105 by performing the process operation of FIG. 10. This process operation mainly corresponds to the document acceptance process operation by the document acceptance processing unit 501 shown in FIG. 5. At a first step 1101, the certificate of the agent contained in the received data is inspected, and also the common key encrypted in this received data is decrypted by using the secret key of the applicant. At a step 1102, the document attached with the agent signature is decrypted by using the decrypted common key. At a step 1103, the signature of this document having the agent signature is inspected by employing the public key of the agent. This inspection corresponds to such a process operation for confirming as to whether or not the value obtained by decrypting the signature data based on the public key of the agent is equal to the compressed data (namely, message digest) which is produced by compressing the document data by the one-way cryptographic function (the same function as that used in the previous step 1001 of FIG. 10 is used). As a result of this inspection, if this signature of the document with the agent signature is equal to a proper signature ("NO" at step 1104), then this document with the agent signature is saved at a step 1105. Conversely, as a result of this inspection, if this signature is not equal to a proper signature ("YES" at step 1104), then the document acceptance unit 501 notifies to the applicant such a fact that the application has been forged at a step 1106. Then, this document acceptance process operation is accomplished.

Figure 12:
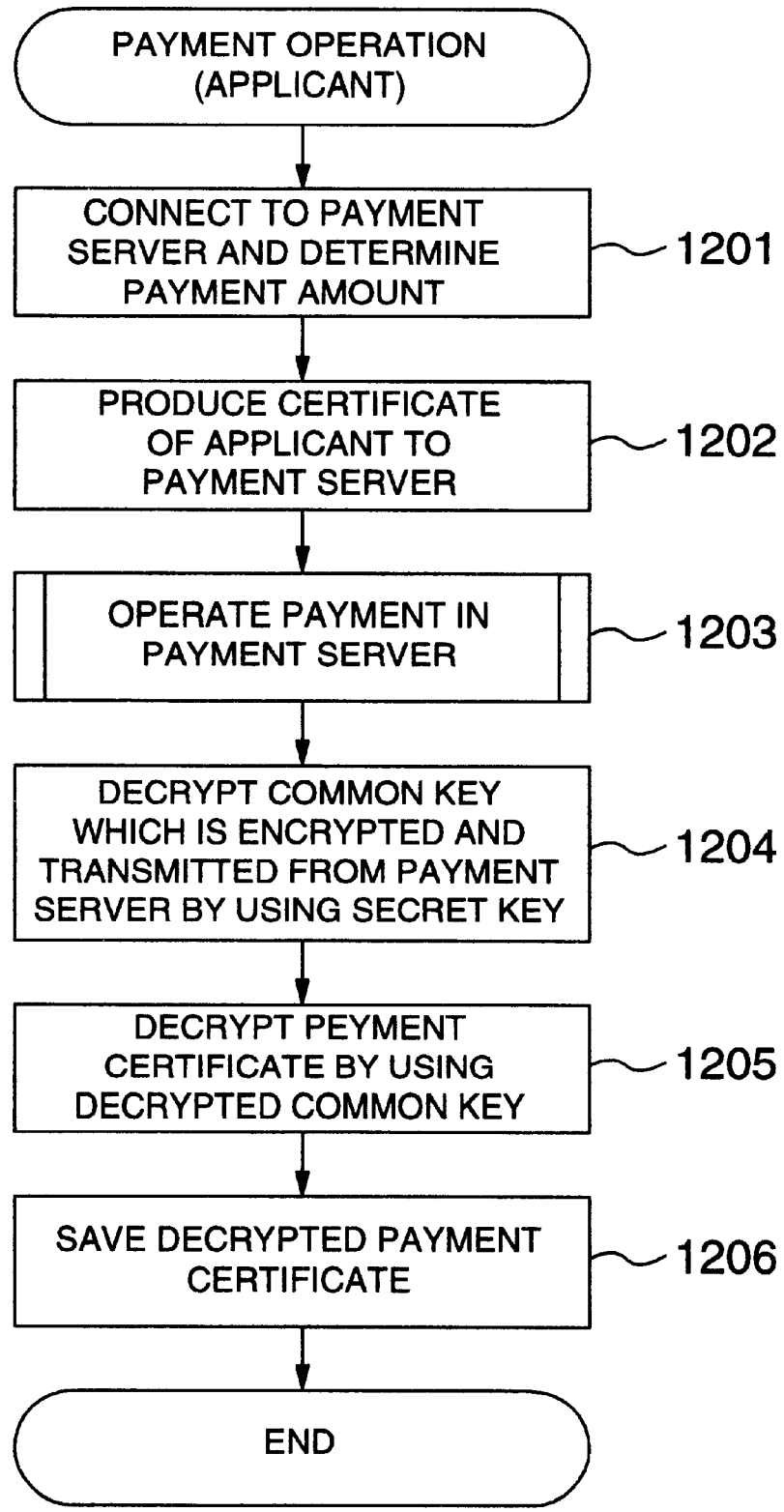
FIG. 12 is a flow chart for describing a process flow of a fee payment by an applicant in the system of the embodiment shown in FIG. 1.

FIG. 12 is a flow chart for explaining a process operation for processing a fee payment by an applicant. This process operation mainly corresponds to a process operation executed by the payment processing unit 505 of FIG. 5. At a first step 1201, the applicant apparatus 105 is connected to the payment acceptance server 102 to determine a payment amount, and then transmits the determined payment amount. At a further step 1202, the certificate of the applicant (namely, certificate acquired from the certificate authority 103) is proposed to the payment acceptance server 102. A process operation defined at a step 1203 corresponds to the process operation executed on the side of the payment acceptance server 102, which will be explained later with reference to FIG. 13. After this step 1203, both the common key encrypted by the public key of the applicant and the payment certificate (FIG. 6) encrypted by this common key are transmitted from the payment acceptance server 102. At a step 1204, the encrypted common key which is transmitted from the payment acceptance server 102 is decrypted by using the secret key of the applicant. At a step 1205, the encrypted payment certificate is decrypted by employing the decrypted common key. At a step 1206, the decrypted payment certificate is saved into the payment certificate management DB 513 (FIG. 7), and then this fee payment process operation is completed.

Figure 13:
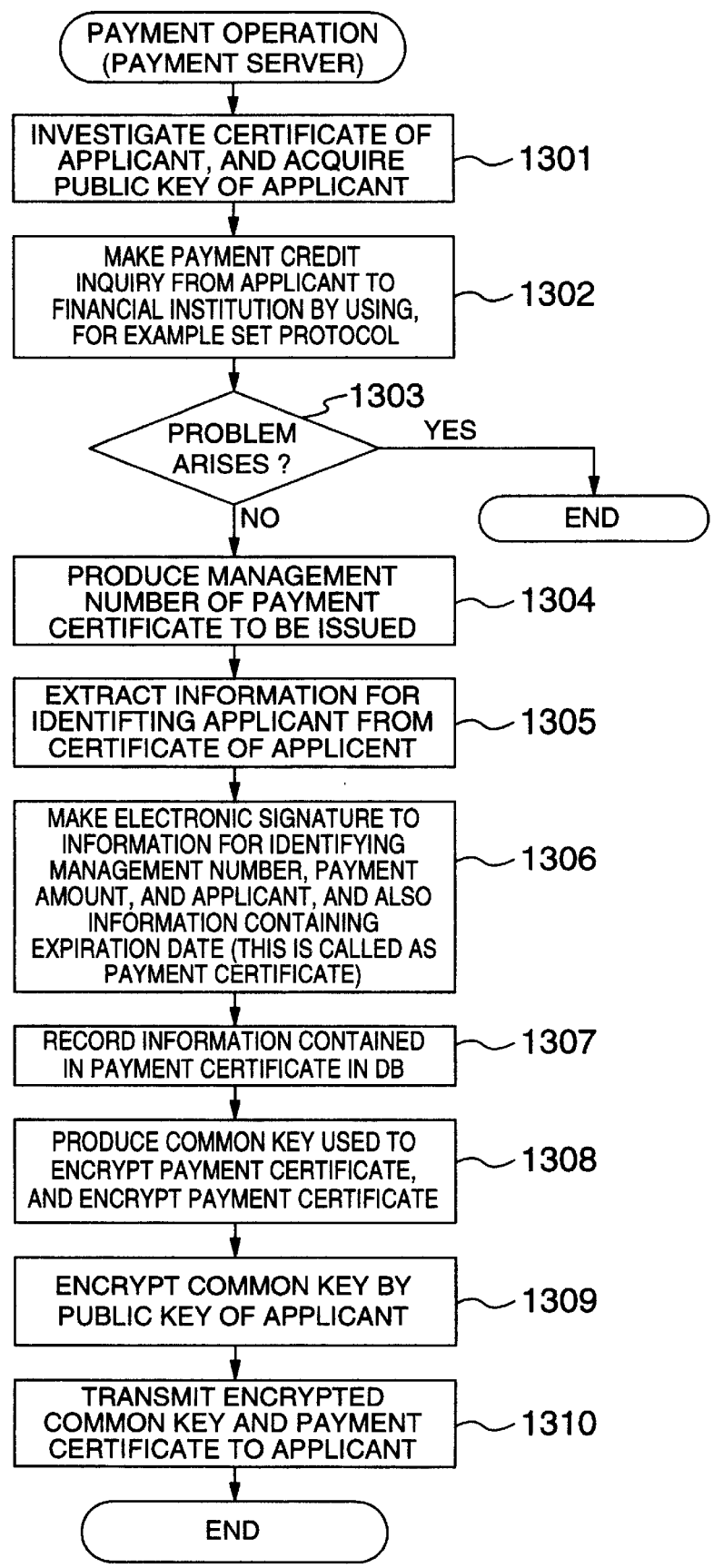
FIG. 13 is a flow chart for explaining a process flow of a payment acceptance process executed in a payment acceptance server in the system of the embodiment of FIG. 1.

FIG. 13 is a flow chart for explaining the above-described process operation defined at the step 1203 of FIG. 12, namely the payment acceptance process operation executed in the payment acceptance server 102. This process operation mainly corresponds to the payment acceptance processing operation by the payment acceptance processing unit 221 of FIG. 12. At a first step 1301, the certificate sent from the applicant is inspected to acquire the public key of the applicant. At a next step 1302, a credit inquiry of a payment by the applicant is made to a financial institution by employing, for example, the SET protocol. Concretely speaking, information for identifying the applicant and the amount to be drawn is sent to the financial institution server 106 of FIG. 1, so that this amount of money can be surely drawn from the financial institution account of this applicant.

It should also be noted that when the payment credit inquiry is made to the financial institution, the identity of the institution which manages the payment acceptance server 102 is required to be certificated to the financial institution. To this end, the institution which manages the payment acceptance server 102 previously acquires the certificate from the financial institution certificate institution 107. In this payment credit inquiry, since the applicant who draws the fee must be authorized (namely, it is required to confirm as to whether or not fee drawing request is certainly issued from this applicant), the applicant also acquires the certificate from the financial institution certificate authority 107 in advance. Furthermore, the certificate of this financial institution is sent to the payment acceptance server 102 at the step 1202. At a step 1302, when the payment acceptance server 102 makes the credit inquiry, it is required to attach the certificate of the financial institution of this applicant.

As a result of the credit inquiry executed at the step 1302, if an allowance equal to the above-explained drawn amount can be secured at a step 1303, then the process operation is advanced to a further step 1304. When a problem happens to occur in the credit inquiry result, this process operation is ended. At this step 1304, a management number of a newly issued payment certificate is acquired. Concretely speaking, a 1-line region of this new management number is secured in the payment certificate management DB 234 having the arrangement of FIG. 7. Next, at a step 1305, information for identifying the applicant is extracted from the certificate of the applicant. At a step 1306, an electronic signature is made to the data concatenated with the management number, the payment amount, the information for identifying the applicant, and the expiration date so as to form the payment certificate (FIG. 6). Concretely speaking, the above-explained concatenated data is compressed by the one-way cryptographic function, and then the signature data is attached to the original concatenated data to thereby form the payment certificate. This signature data is obtained by encrypting the compressed data based upon the secret key of the payment acceptance server 102.

At a step 1307, the information contained in this formed payment certificate is recorded on the payment certificate management DB (FIG. 7). At a step 1308, a common key is produced which is used to encrypt the payment certificate, and this produced common key is employed so as to encrypt the payment certificate. Next, at a step 1309, the above common key is encrypted by the public key of the applicant. At a step 1310, both the encrypted common key and the payment certificate which is encrypted by this common key are sent to the applicant apparatus 105, and then the process operation is ended.

Figure 14:
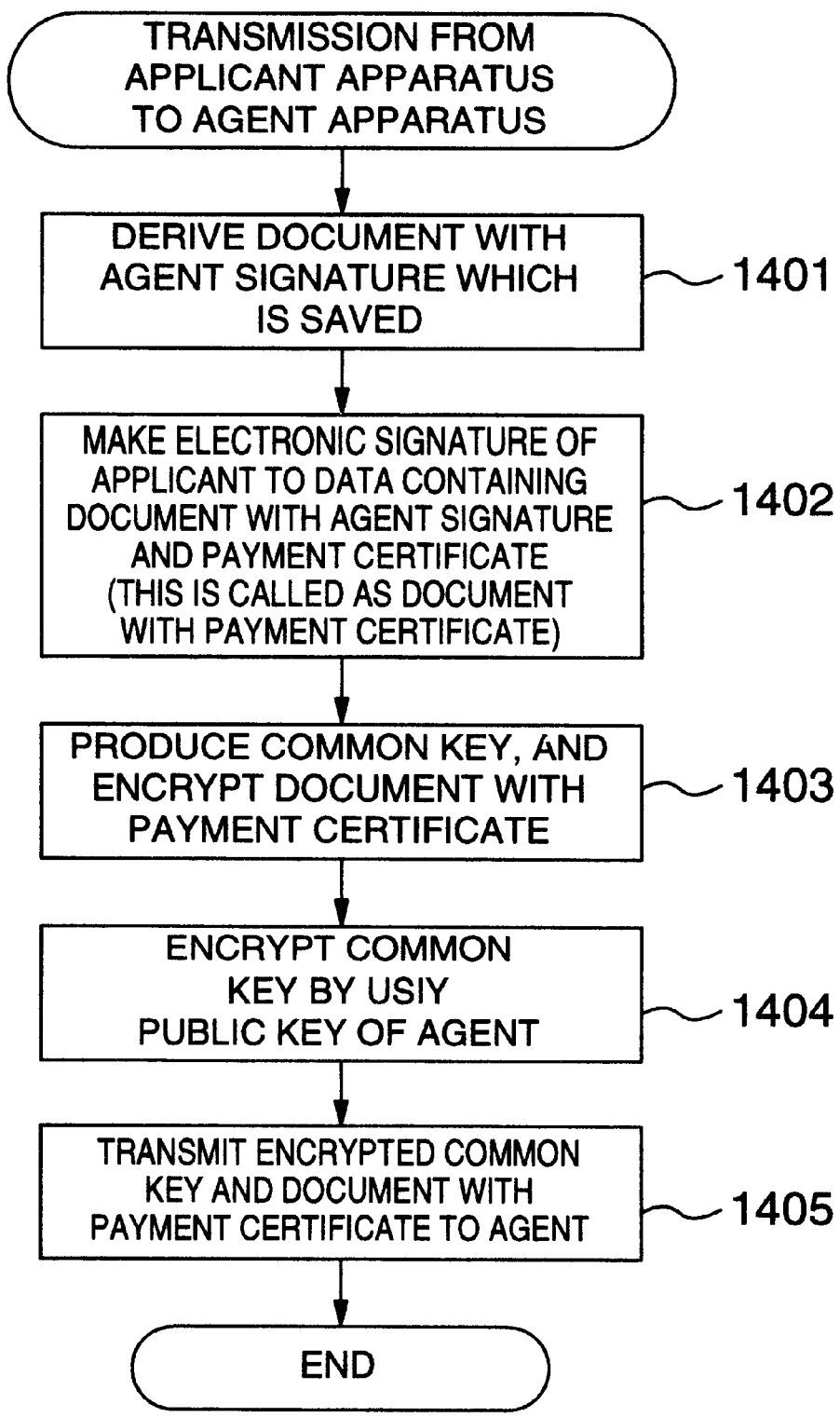
FIG. 14 is a flow chart for describing a process flow of a document transmitted from an applicant apparatus to an agent apparatus in the system of FIG. 1.

FIG. 14 is a flow chart for describing a process flow operation of transmitting the document from the applicant apparatus 105 to the agent apparatus 104. This process operation mainly corresponds to the process operation executed by the document transmitting unit 506 of FIG. 5. At a first step 1401, the document with the agent signature saved at the step 1105 of FIG. 11 is derived. At a step 1402, an electronic signature of the applicant is made of the data containing the document with the agent signature and the payment certificate. The resultant document will be referred to as a "document with a payment certificate". It should be noted that as a payment certificate used in this embodiment, such a payment certificate is employed among the payment certificates managed by the payment certificate management DB 513 having the arrangement of FIG. 7, namely the use state 706 thereof is "unused".

Next, at a step 1403, a common key is produced, and then the document with the payment certificate is encrypted by this common key. At a step 1404, this common key is encrypted by using the public key of the agent. At a step 1405, both the encrypted common key and the document with the payment certificate which is encrypted by this common key are sent to the agent apparatus 104.

Figure 15:
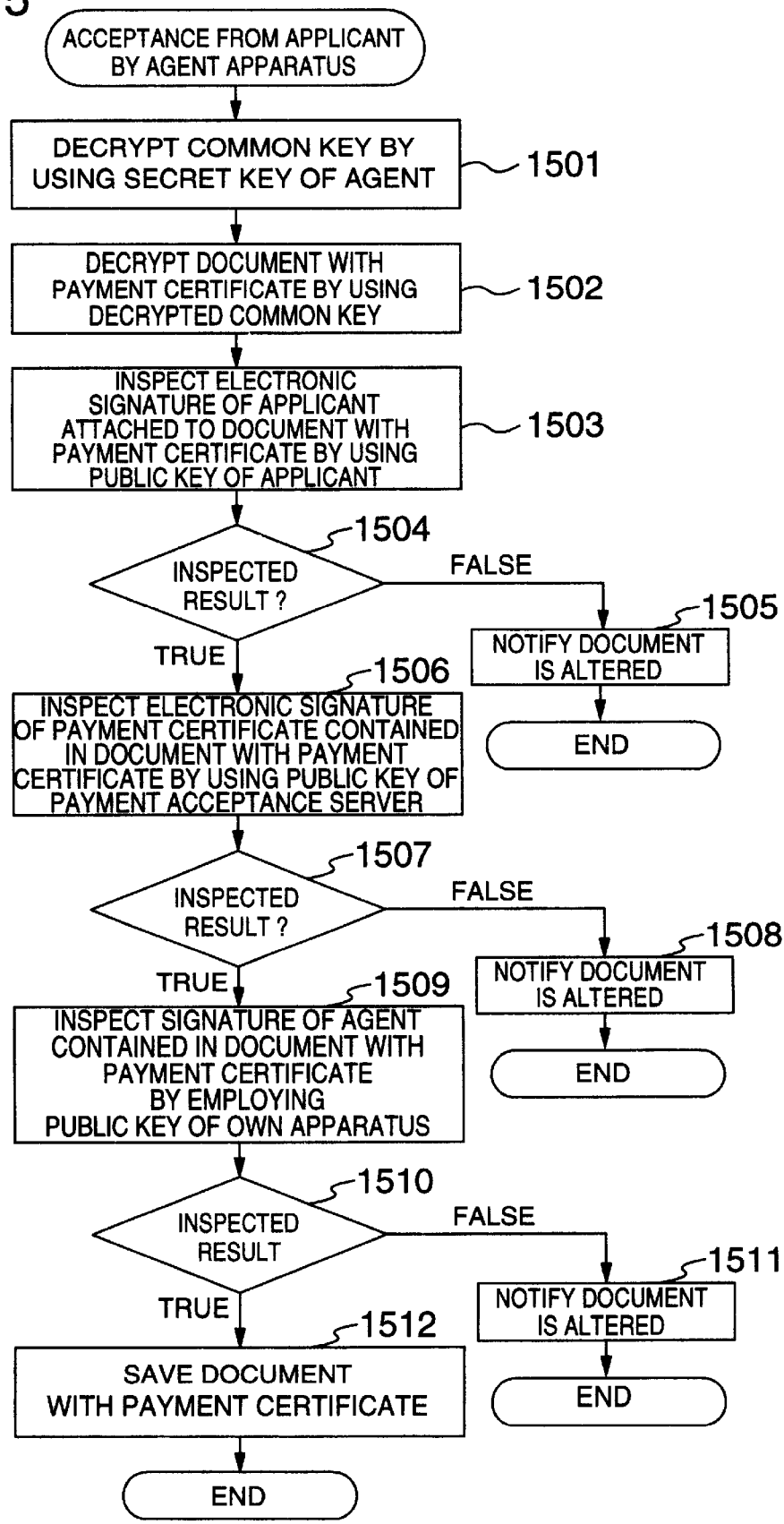
FIG. 15 is a flow chart for explaining a process flow of an agent apparatus for accepting data from an applicant in the system of FIG. 1.

FIG. 15 is a flow chart for describing a process operation of the agent apparatus 104 for receiving the data transmitted from the applicant in FIG. 14. This process operation mainly corresponds to the document acceptance process operation by the document acceptance processing unit 405 shown in FIG. 4. At a first step 1501, the encrypted common key contained in the received data is decrypted by employing the secret key of the agent. At a step 1502, the document with the payment certificate is decrypted by employing the decrypted common key. At a step 1503, the electronic signature of the applicant, which is attached to this document with the payment certificate, is inspected by employing the public key of the applicant. Concretely speaking, this inspection corresponds to such a process operation for checking as to whether or not the value obtained by decrypting the signature data based, upon the public key of the applicant is made equal to the compressed data which is obtained by compressing the document with the payment certificate by using the one-way cryptographic function (namely, the same function as that used in the signature at step 1402 of FIG. 14).

If it is inspected at a step 1504 that this electronic signature is a proper signature, then the process operation is advanced to a step 1506. At this step 1506, the electronic signature of the payment certificate contained in the document with the payment certificate is inspected by employing the public key of the payment acceptance server 102. This inspection corresponds to such a process operation for confirming as to whether not the value obtained by decrypting the signature data by the public key of the payment acceptance server 102 is made equal to the compressed data. This compressed data is obtained by compressing by using the one-way cryptographic function (same function as that used in the signature of step 1306 in FIG. 13), such data for concatenating the management number, the payment amount, the information for identifying the applicant, and the expiration date, which are contained in the payment certificate.

If it is inspected at a step 1507 that this electronic signature is a proper signature, then the process operation is advanced to a step 1509. At this step 1509, the electronic signature of the agent of the document having the agent signature contained in the document with the payment certificate is inspected by employing the secret key of the agent. If it is inspected that this signature is a proper signature at a step 1510, then the document having the payment certificate is saved at a step 1512, and the process operation is accomplished. Conversely, when the inspection result indicates that the electronic signature is an illegal signature at any one of the above-described steps 1504, 1507, and 1510, the agent apparatus notifies to the agent, such a fact that the document is forged at the respective steps 1505, 1508, 1511. Then, the process operation is ended.

Figure 16:
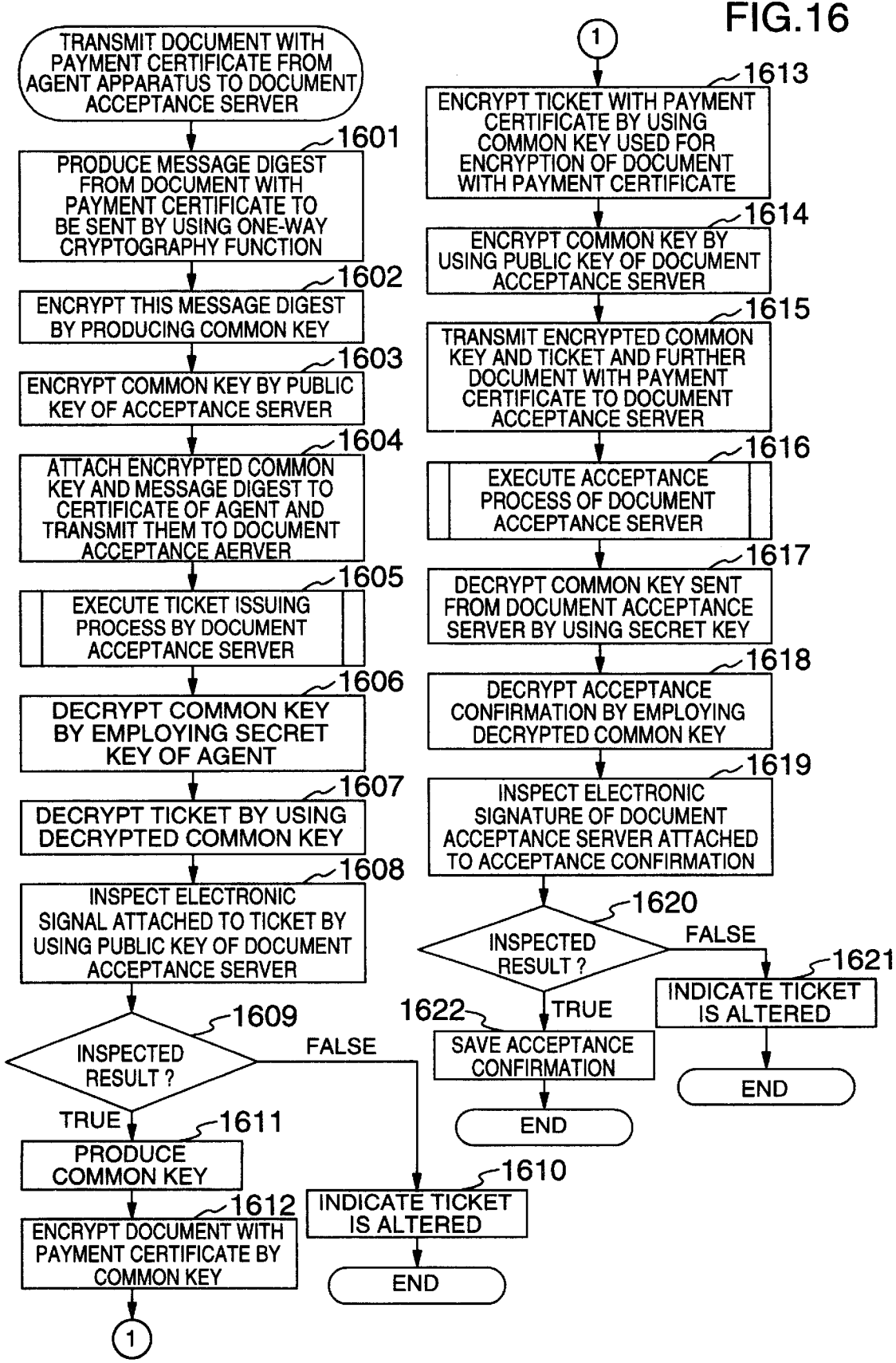
FIG. 16 is a flow chart for describing a process flow operation for transmitting a document with a payment certificate from an applicant apparatus to a document acceptance server in the system shown in FIG. 1.

FIG. 16 is a flow chart for describing a process flow operation of transmitting the document having the payment certificate from the agent apparatus 104 to the document acceptance server 101. This process operation mainly corresponds to the process by the document transmitting unit 404 of FIG. 4. At a first step 1601, a document with a payment certificate which will be transmitted is compressed by using the one-way cryptographic function to thereby produce compressed data (message digest). Next, at a step 1602, a common key is produced, and the above-explained message digest is encrypted by this common key. At a step 1603, the above common key is encrypted by way of the public key of the document acceptance server 101. At a step 1604, a certificate of an agent is attached to the encrypted common key and the message digest encrypted by this common key so as to transmit them to the document acceptance server 101. Since the transmission period of the message digest is considerably shorter than the overall transmission period of the document corresponding to this message digest, there is a very rare possibility that the transmission of the message digest is adversely influenced by the failure occurring in the communication line. A process operation defined at a step 1605 corresponds to the ticket issuing process operation on the side of the document acceptance server 101, which will be discussed with reference to FIG. 17. After this step 1605, both the common key encrypted by the public key of the agent (namely, key produced on the side of document acceptance server 101), and the ticket (see FIG. 8) encrypted by this common key are transmitted from the document acceptance server 101.

At a step 1606, the encrypted common key which is transmitted from the document acceptance server 101 is decrypted by using the secret key of the agent. At a step 1607, the ticket is decrypted by using the decrypted common key. Next, at a step 1608, the electronic signature attached to the ticket (FIG. 8) is inspected by using the public key of the document acceptance server 101. If the inspection result indicates that this electronic signature is a proper signature at the step 1609, since the document acceptance server 101 does secure either the acceptance day/time or the submission day/time, and therefore the process operation is advanced to a further step 1611. Conversely, when the inspected electronic signature corresponds to an illegal signature at a step 1609, the document acceptance server notifies that the ticket has been forged to the agent at a step 1610, and then the process operation is accomplished.

When the correct ticket is received, a common key is produced at a step 1611. At a step 1612, the document with the payment certificate is encrypted by this common key. At a step 1613, the ticket is encrypted by this common key. Next, at a step 1614, the above common key is encrypted by the public key of the document acceptance server 101. Then, at a step 1615, the encrypted common key, the ticket encrypted by this common key, and also the document with the payment certificate are transmitted to the document acceptance server 101. A process operation defined at a step 1616 corresponds to the process operation on the side of the document acceptance server 101, which will be discussed late with reference to FIG. 18. After this step 1616, both the common key encrypted by the public key of the agent and an acceptance confirmation encrypted by this common key are sent from the document acceptance server 101.

At a step 1617, the encrypted common key which is transmitted from the document acceptance server 101 is decrypted by using the secret key of the agent. At a step 1618, the encrypted acceptance confirmation is decrypted by using the decrypted common key. Next, at a step 1619, the electronic signature of the document acceptance server 101 attached to the acceptance confirmation is inspected. If the inspection result indicates that this electronic signature is a proper signature at the step 1620, the acceptance confirmation is saved at a step 1622. Then, the process operation is ended. At a step 1602, if the inspection result indicates that this electronic signature corresponds to an illegal signature, the document acceptance server notifies that the data has been forged to the agent at this step 1620, and then the process operation is ended.

Figure 17:
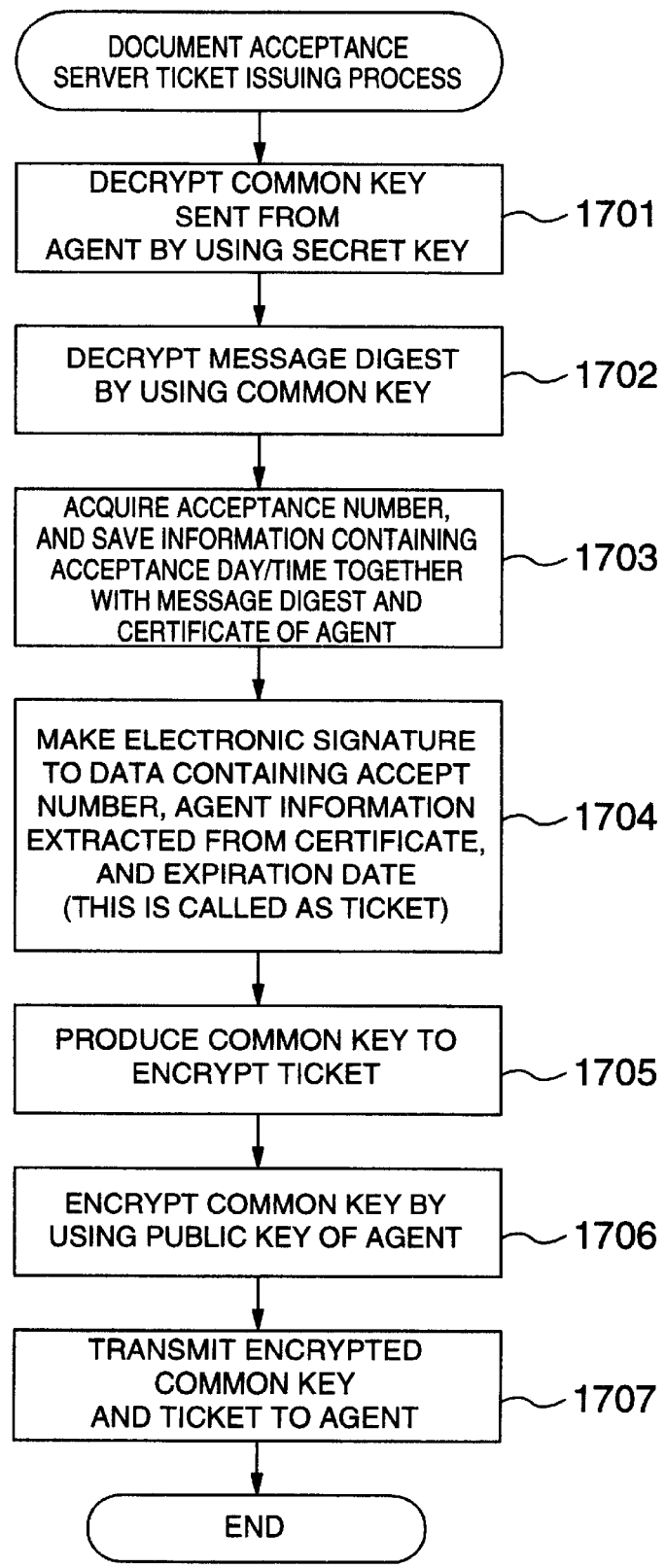
FIG. 17 is a flow chart for explaining a process flow operation for issuing a ticket by a document acceptance server in the system shown in FIG. 1.

FIG. 17 is a flow chart for describing the process flow operation of the step 1605 shown in FIG. 16, namely the ticket issuing process flow operation by the document acceptance server 101. This process operation mainly corresponds to the ticket issuing operation by the ticket issuing unit 211 of FIG. 2. At a first step 1701, the common key sent from the agent is decrypted by using the secret key of the document acceptance server 101. Next, at a step 1702, the message digest is decrypted by using this common key. Then at a step 1703, a new acceptance number is acquired. Also, this acceptance number 901, information 902 related to the agent (transmitter), an acceptance day/time 903, an expiration date 904, a message digest 905, and a certificate 906 of the agent are saved in the acceptance management DB 231 (FIG. 9). It should be noted that the information extracted from the certificate of the agent, which is contained in the data sent from the agent, is set into the information related to the agent. Expiration date is obtained by adding arbitrary time to the current time. Also, the ticket management information 907 is initialized as "unused".

Next, at the step 1704, such data is produced which is concatenated with the acceptance number 801, the information 802 related to the agent, the acceptance day/time 803, and the expiration date 804. Then, the electronic signature 805 is made of this concatenated data. The data with the electronic signature corresponds to the ticket (FIG. 8). Concretely speaking, the above concatenated data is compressed by the one-way cryptographic function (same functions as those used in steps 1601 and 1608 of FIG. 16). The signature data obtained by encrypting this compressed data by the secret key of the document acceptance server 101 is attached to the original concatenated data so as to form the ticket (FIG. 8). Next, at a step 1705, a common key is produced, and then the ticket is encrypted by this common key. At a step 1707, both the encrypted common key and the ticket encrypted by this common key are sent to the agent, and the process operation is ended.

Figure 18:
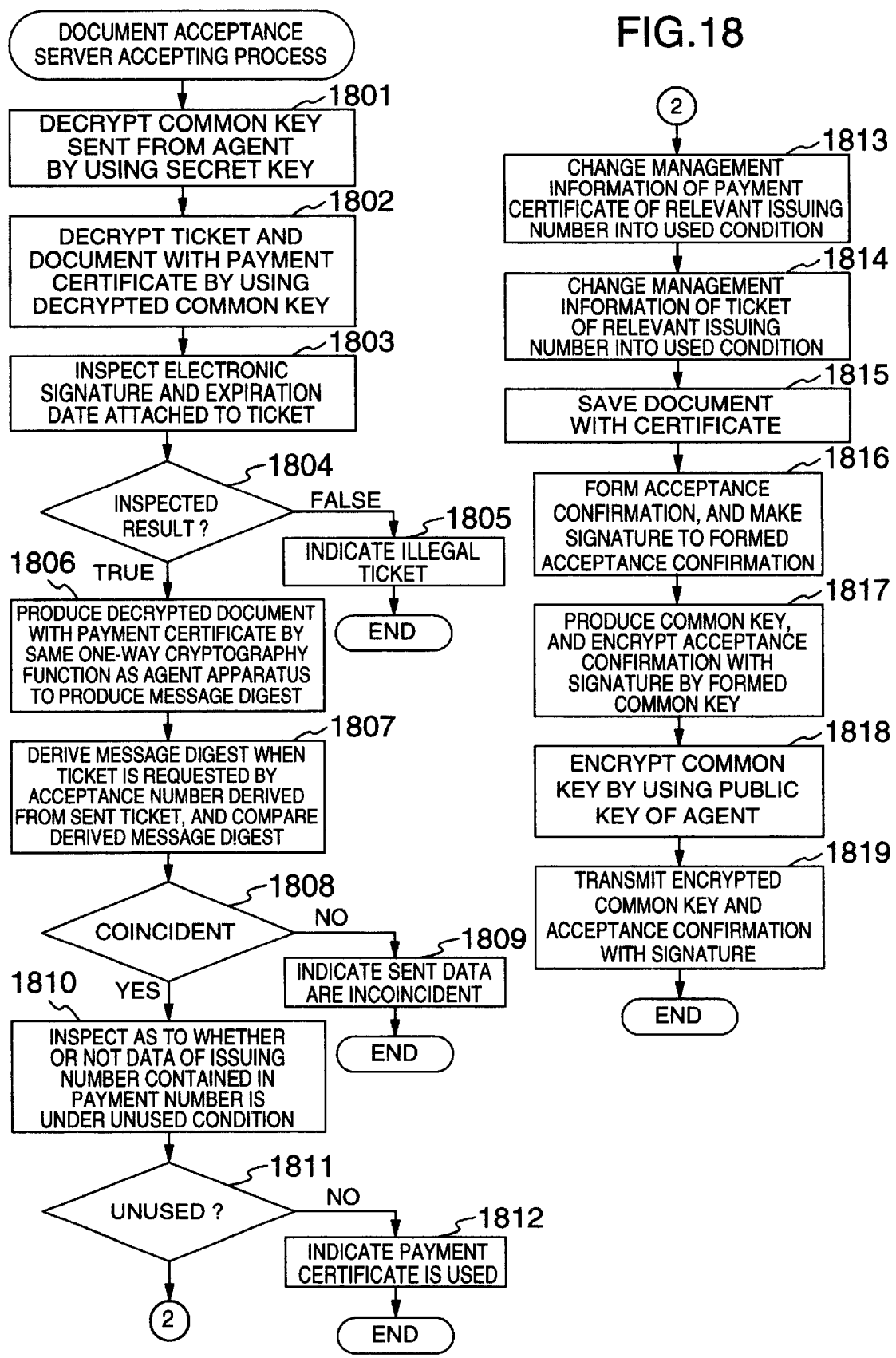
FIG. 18 is a flow chart for describing a process flow operation for accepting a document by a document acceptance server in the system shown in FIG. 1.

FIG. 18 is a flow chart for describing the process flow operation of the step 1616 shown in FIG. 16, namely the document acceptance process flow operation by the document acceptance server 101. This process operation mainly corresponds to the document accepting operation by the document acceptance unit 212 of FIG. 2. At a first step 1801, the common key sent from the agent is decrypted by using the secret key of the document acceptance server 101. Next, at a step 1802, both the ticket and the document having the corticate are decrypted by using the decrypted common key. Next, at a step 1803, both the electronic signature and the expiration date attached to the ticket are inspected. As a result of this inspection, when the signature is a proper signature and the expiration date is valid at a step 1804, the process operation is advanced to a step 1806. Conversely, when the electronic signature is an illegal signature, or the effective expiration date is expired, an indication of "illegal ticket" is made at a step 1805, and then the process operation is accomplished.

At a step 1806, the document having the payment certificate transmitted from the agent is compressed by the one-way cryptographic function (same function as those used at steps 1601 and 1608 of FIG. 16) to produce a message digest. At a step 1807, an acceptance number is derived from the ticket sent from the agent. Next, referring to the acceptance management DB 231 (FIG. 9), a message digest, which was created when a request is made for the ticket corresponding to this acceptance number, is derived, and compared with the message digest produced at the step 1806. As a comparison result, when these message digests are made identical with each other, it can be recognized that the content of the document which has been surely sent when the ticket was requested is actually transmitted. Therefore, the process operation is advanced to a step 1810. When the compared message digests are not made identical with each other at the step 1808, it can be recognized that the different content from the content of the document which has been sent which the ticket was requested is actually transmitted. Thus, an indication such that the transmitted data are not made identical with each other is made at a step 1809, and then the process operation is ended.

At a step 1810, the data of the management number contained in the payment certificate is searched from the payment certificate management DB 234 (FIG. 7) so as to inspect as to whether or not the case state 706 is "unused". When it is so checked that the use state is "unused" at a step 1811, the use state 706 of the payment certificate of the relevant management number of the payment certificate management DB 234 is changed into "used" at a step 1813. Next, at a step 1814, the management information 907 of the ticket of the relevant acceptance number is changed into "used". Then, at a step 1815, the document with the payment certification is saved. The document is saved by being stored into the content 908 of the document of the acceptance management DB 231 shown in FIG. 9.

Furthermore, at a step 1816, an acceptance confirmation containing the acceptance information such as the acceptance number is produced and an electronic signature is made. At a step 1817, a common key is produced, and the above-described acceptance confirmation with the electronic signature is encrypted. At a step 1818, the above common key is encrypted by the public key of the agent. At a step 1819, both the encrypted common key and the acceptance confirmation having the electronic signature which is encrypted by this common key are transmitted to the agent, and then the process operation is ended.

In accordance with the document transmit system of the above-described embodiment, the applicant acquires the payment certificate, the agent attaches the payment certificate to the document to be submitted, and this agent can transmit the document attached with the payment certificate to the document acceptance server. The payment certificate can be used while the user can have such feelings of a stamp, an inspection sticker, a note, and a gift certificate. Since this payment certificate is attached with the signature of the payment acceptance server, this payment certificate cannot be easily forged. Any types of actual payments may be realized. Since such a guarantee is made that the fee amount can be drawn at the stage of the payment credit inquiry, the document acceptance server necessarily can receive the fee. Also, the applicant attaches the payment certificate to the document, and then makes the signature to the entire document so as to transmit the document having the signed payment certificate to the agent. Accordingly, the applicant indicates his/her willing to accept the content of this document, and also the agent cannot forge this document after receiving this signed document.

Furthermore, when the document submission timing is determined, the document data to be sent from the provider is firstly compressed by the one-way cryptographic function to produce the message digest. This message digest is sent together with the certificate to the document acceptance server. In this document acceptance server, this message digest is stored and the ticket is returned. Thereafter, when the overall document data is sent from the provider, the message digest of this overall document data is obtained and is compared with the message digest which has been stored when the ticket is issued. As a consequence, it can be confirmed that such a document which is originally intended to be sent is actually transmitted. As a consequence, it can be regarded that the timing when the ticket is issued is equal to the timing when the document is submitted.

FIG. 19 illustratively shows a determining condition of document acceptance time in such a case that electronic documents are transmitted from two sets of agent apparatuses at the substantially same time to the document acceptance server 101, respectively.

In this drawing, a message digest A of an electronic document A is firstly transmitted from the agent apparatus 104. Upon receipt of the message digest A, the document acceptance server 101 decrypts the message digest in accordance with the steps 1701 to 1702 of FIG. 17, and determines an acceptance number of the electronic document A and also acceptance day/time of this document A at the step 1703. This process operation corresponds to the step 1901 of FIG. 19.

On the other hand, the message digest B of the electronic document B is transmitted from the agent apparatus 104' is transmitted to the document acceptance server 101, which is slightly delayed from the message digest A. Similarly, upon receipt of the message digest B the document acceptance server 101 determines an acceptance number of the document B and an acceptance number of the document B at the step 1902.

Next, the document B with the payment certificate is transmitted from the agent apparatus 104' to the document acceptance server 101. Thereafter, the document A having the payment certificate is transmitted from the agent apparatus 104 to the document acceptance server 101. When both the document A and B are proper documents, the document acceptance server 101 issues document acceptance confirmations to the agent apparatuses 104 and 104', respectively.

As apparent from FIG. 19, the transmission of the message digest A from the agent apparatus 104 to the document acceptance server 101 is carried out earlier than the transmission of the message digest B from another agent apparatus 104'. However, the transmission of the document A is carried out later than the transmission of the document B. In this case, the acceptance day/time determined at the step 1901 is given to the document A, whereas the acceptance day-time determined at the step 1902 is given to the document B. In other words, the acceptance day/time of the document A become earlier than that of the document B. Assuming now that both the document A and the document B correspond to patent specifications having the same inventive ideas, and further the document acceptance server 101 corresponds to a patent office, this patent office may determine that the document A is equal to the patent application filed in the earliest stage.

In the above-explained embodiment, the agent submits the document on behalf of the applicant. Alternatively, the applicant may directly transmit the document to the document acceptance server not via the agent.

Also, in the above-described embodiment, the SET (Secure Electronic Transaction) system is employed as the payment system. Alternatively, other payment systems than this SET system, for example, a payment system with using a credit card without using the SET system may be conducted.

Further, in the above-explained embodiment, the applicant is equal to the fee payer. Alternatively, the present invention may be applied to another case that the applicant is not equal to the fee payer. In this alternative case, a payer apparatus corresponding to a computer node of this fee payer may be realized by having an arrangement similar to that of the applicant apparatus 105 shown in FIG. 5. Upon receipt of a fee payment request issued from the applicant, the payer apparatus requests the payment process to the payment acceptance server 102. The payment acceptance server 102 transmits the payment certificate to the fee payer after making the credit inquiry of the fee payer. This payment certificate is transferred from the fee payer apparatus to the applicant apparatus 105.

The present invention may be applied to the following cases. That is, a document is transmitted via the Internet to a governmental office such as a patent office, a registry office, and a public office. Also, the present invention may be applied to a so-called "electronic shopping".

What is claimed is:

1. A document transmit system wherein a document is transmitted from a predetermined apparatus via a network to a document acceptance server, comprising:
a document transmit processing unit for applying an one-way cryptographic function to document data to be transmitted so as to obtain first compressed data in a document transmitting apparatus, and then transmitting said first compressed data to said document acceptance server;
a ticket issue processing unit for transmitting a ticket to said document transmitting apparatus after receipt of said first compressed data and storage of said first compressed data into a storage apparatus by said document acceptance server,
wherein said document acceptance server allocates an acceptance number to each first compressed data received from said document transmitting apparatus, and
wherein said ticket includes an acceptance number corresponding to said first compressed data received from said document transmitting apparatus;
a document transmit processing unit for transmitting said document data to be transmitted to said document acceptance server after the ticket is received by said document transmitting apparatus; and
a document acceptance processing unit for receiving said document data, applying said one-way cryptographic function to said document data so as to obtain second compressed data, comparing said second compressed data with said first compressed data which is stored in the storage apparatus after said document data is received by said document acceptance server, and confirming that said first compressed data is identical with said second compressed data.

2. A document transmit system as claimed in claim 1, wherein said ticket contains at least one of a number allocated by said document acceptance server, information concerning said document transmitting apparatus which transmits said document data, an expiration date and a signature.

3. A data transmit system for transmitting data from a predetermined apparatus to a document acceptance server, comprising:
wherein said predetermined apparatus includes an encryption/decryption processing unit for compressing data to be transmitted to obtain first compressed data, and a document transmit processing unit for transmitting said data, said compressed data and a ticket including information for identifying said compressed data to said document acceptance server;
wherein said document acceptance server includes a storage unit for storing said first compressed data transmitted from said predetermined apparatus, an encryption/decryption processing unit for compressing said data transmitted from said predetermined apparatus to obtain second compressed data, and a document acceptance processing unit for identifying said first compressed data stored in said storage unit from the information contained in said ticket transmitted from said predetermined apparatus, comparing said first compressed data thus identified with second compressed data obtained by said encryption/decryption processing unit of said document acceptance server, and confirming that both said first compressed data and said second compressed data are identical with each other;
wherein said document acceptance server allocates an acceptance number to each first compressed data received from said predetermined apparatus; and
wherein said ticket includes an acceptance number corresponding to said first compressed data received from said predetermined apparatus.

4. A data transmit system as claimed in claim 3, wherein said encryption/decryption processing unit of said predetermined apparatus creates said first compressed data by applying a one-way cryptograph function to said data to be transmitted, and
wherein said encryption/decryption processing unit of said document acceptance server creates said second compressed data by applying a one-way cryptographic function to said data transmitted.

5. A document transmit system as claimed in claim 3, wherein said ticket contains at least one of a number allocated by said document acceptance server, information concerning said predetermined apparatus which transmits said data, an expiration date and a signature.

6. A data transmit method for transmitting data from a predetermined apparatus to a document acceptance server, said method comprising the steps of:
creating, by said predetermined apparatus, first compressed data by applying a one-way cryptographic function to data to be transmitted, and transmitting said first compressed data to said document acceptance server;
receiving, by said document acceptance server, said first compressed data transmitted from said predetermined apparatus, storing said first compressed data thus received, and thereafter transmitting a ticket to said predetermined apparatus,
wherein said document acceptance server allocates an acceptance number to each first compressed data received from said predetermined apparatus, and wherein said ticket includes an acceptance number corresponding to said first compressed data received from said predetermined apparatus; and receiving, by said document acceptance server, said data to be transmitted from said predetermined apparatus, creating second compressed data by applying a one-way cryptographic function to said data received from said predetermined apparatus, comparing said second compressed data thus created by said document acceptance server with said first compressed data stored by said document acceptance server, and confirming that both said first and said second compressed data are identical with each other.

7. A data transmit method as claimed in claim 6, wherein said ticket contains at least one of a number allocated by said document acceptance server, information concerning said predetermined apparatus which transmits said data, an expiration date and a signature.

8. A data transmit method for transmitting data from a predetermined apparatus to a document acceptance server, comprising the steps of:

creating, by said predetermined apparatus, first compressed data by applying a one-way cryptographic function to data to be transmitted, and transmitting said first compressed data to said document acceptance server;

receiving, by said document acceptance server, said first compressed data transmitted from said predetermined apparatus, storing said first compressed data thus received, and thereafter transmitting a ticket for identifying said first compressed data thus stored to said predetermined apparatus, wherein said document acceptance server allocates an acceptance number to each first compressed data received from said predetermined apparatus, and wherein said ticket includes an acceptance number corresponding to said first compressed data received from said predetermined apparatus;

transmitting, by said predetermined apparatus, said data to be transmitted and said ticket to said document acceptance server; and receiving, by said document acceptance server, said data to be transmitted, creating second compressed data by applying a one-way cryptographic function to said data received, comparing said second compressed data thus created by said document acceptance server with said first compressed data stored, and confirming that both said first and said second compressed data are identical with each other.

9. A document transmit method as claimed in claim 8, wherein said ticket contains at least one of a number allocated by said document acceptance server, information concerning said predetermined apparatus which transmits said data, an expiration date and a signature.

* * * * *